United States Patent [19]

Johnson et al.

[11] Patent Number: 4,571,645
[45] Date of Patent: Feb. 18, 1986

[54] HORIZONTAL FLEXIBLE DISK LOADING AND SORTING/COLLATING MECHANISM

[75] Inventors: Ronald R. Johnson, Shorewood; Walter Gysling, Excelsior; David C. Burns, Mound; Richard D. Schuelke, Jordan; James A. Sieben, Mound, all of Minn.

[73] Assignee: IXI Laboratories, Inc., Shorewood, Minn.

[21] Appl. No.: 690,514

[22] Filed: Jan. 10, 1985

Related U.S. Application Data

[63] Continuation of Ser. No. 402,841, Jul. 29, 1982, abandoned.

[51] Int. Cl.[4] ............................................. G11B 5/012
[52] U.S. Cl. ....................................................... 360/98
[58] Field of Search ................................. 360/97–99, 360/133, 135, 86; 369/180, 178, 191–195; 271/297

[56] References Cited

U.S. PATENT DOCUMENTS

| | | | |
|---|---|---|---|
| 3,768,815 | 10/1973 | Mathurin | 274/40 |
| 3,879,757 | 4/1975 | Elliott et al. | 360/99 |
| 3,940,794 | 2/1976 | Griffiths et al. | 360/99 |
| 4,089,029 | 5/1978 | Castrodale et al. | 360/99 |
| 4,141,546 | 2/1979 | Queener | 271/173 |
| 4,164,765 | 8/1979 | Gysling | 360/92 |
| 4,170,030 | 10/1979 | Castrodale et al. | 360/98 |
| 4,170,031 | 10/1979 | Beuch et al. | 360/98 |
| 4,195,321 | 3/1980 | Chelin | 360/98 |
| 4,232,861 | 11/1980 | Maul | 271/297 X |

*Primary Examiner*—A. J. Heinz
*Attorney, Agent, or Firm*—Orrin M. Haugen; Thomas J. Nikolai

[57] ABSTRACT

A system for handling and sorting floppy disk-type data, storage media. A stack of diskettes to be sorted is positioned proximate a diskette reader having a floppy disk drive contained therein. A picker mechanism is disposed beneath the stack and operates to repeatedly remove the lowermost disk from the stack and to feed it via a reversible pinch-roller conveyor first to the drive mechanism in the reader where information is read and then to one of a plurality of sorter bins located serially downstream from the reader via the same conveyor, the particular sorter bin being determined by the information read from the floppy disk.

19 Claims, 41 Drawing Figures

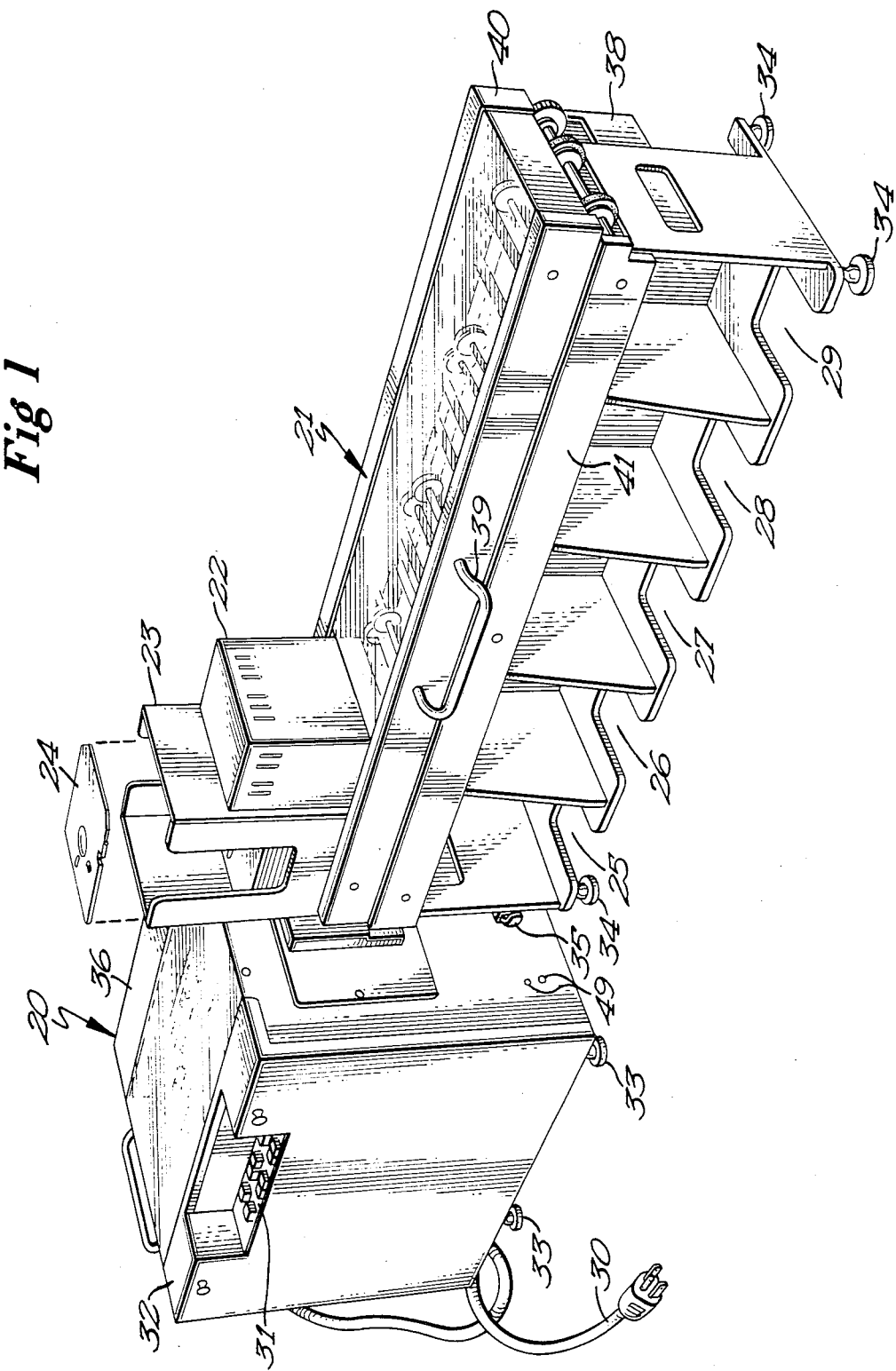

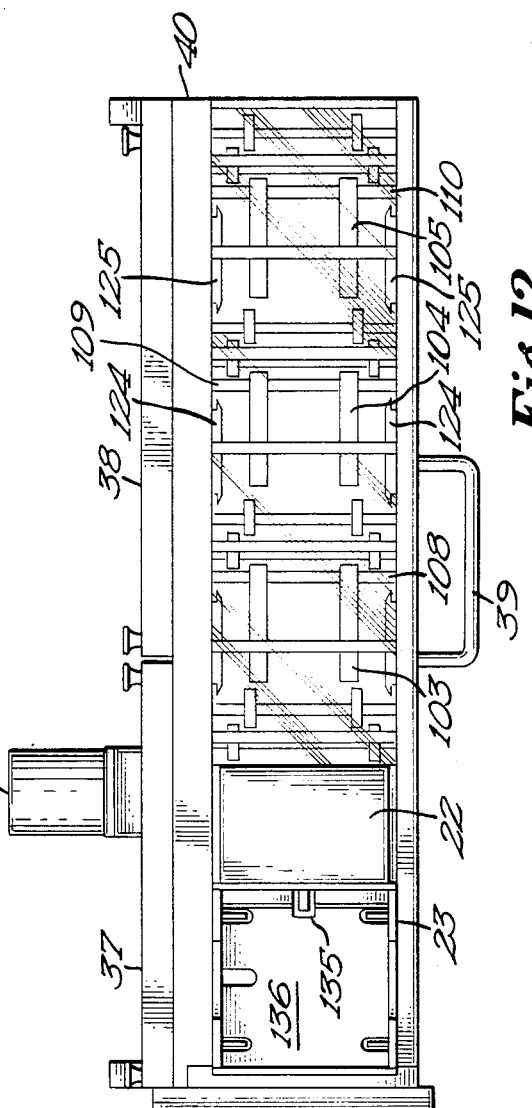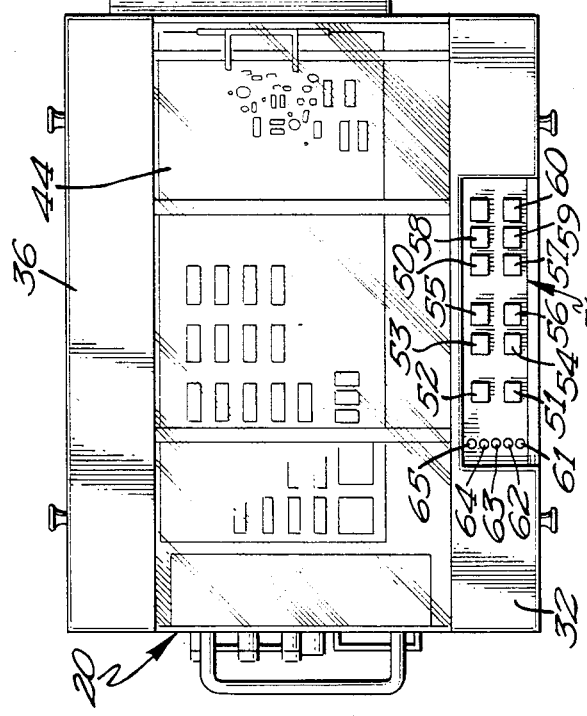

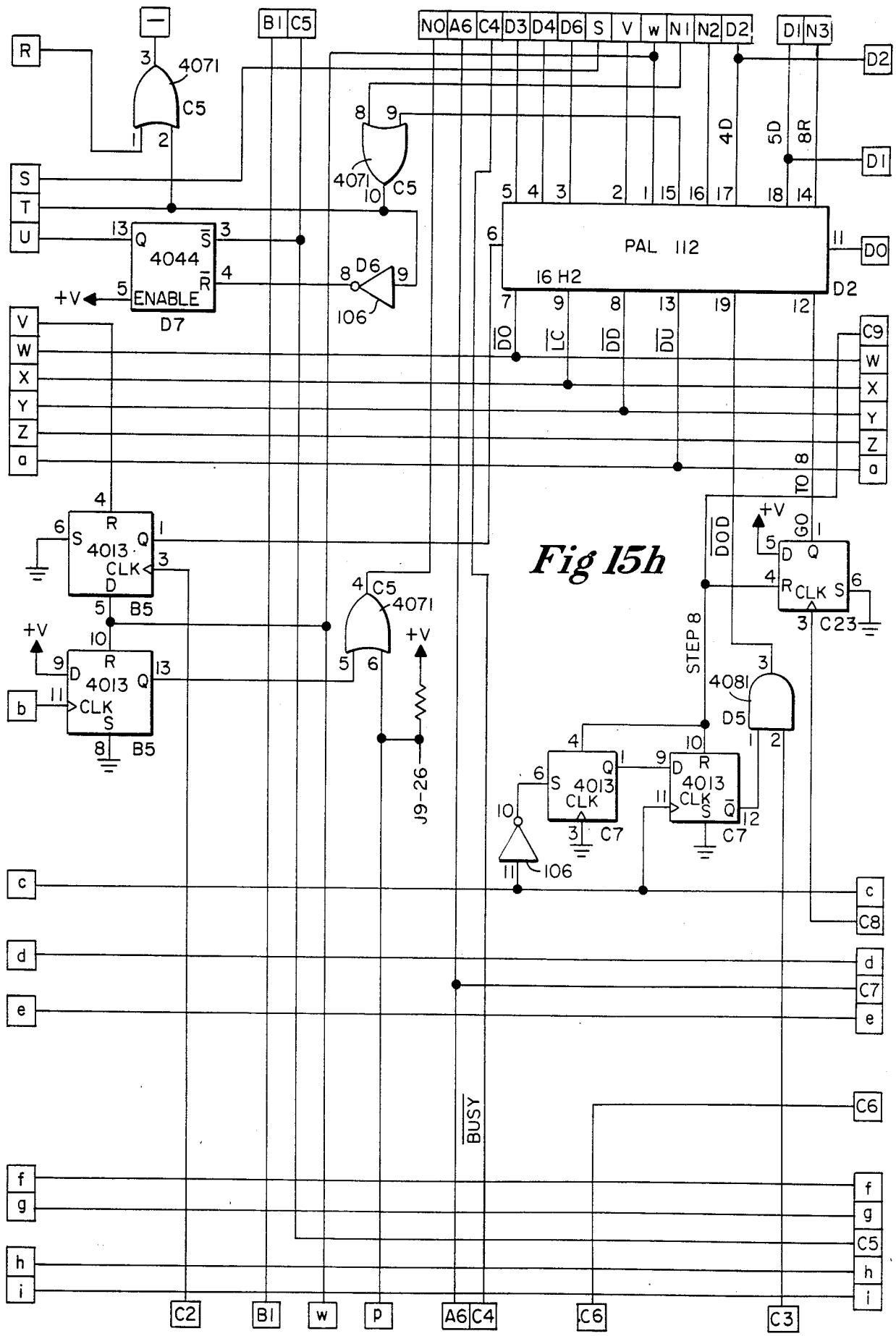

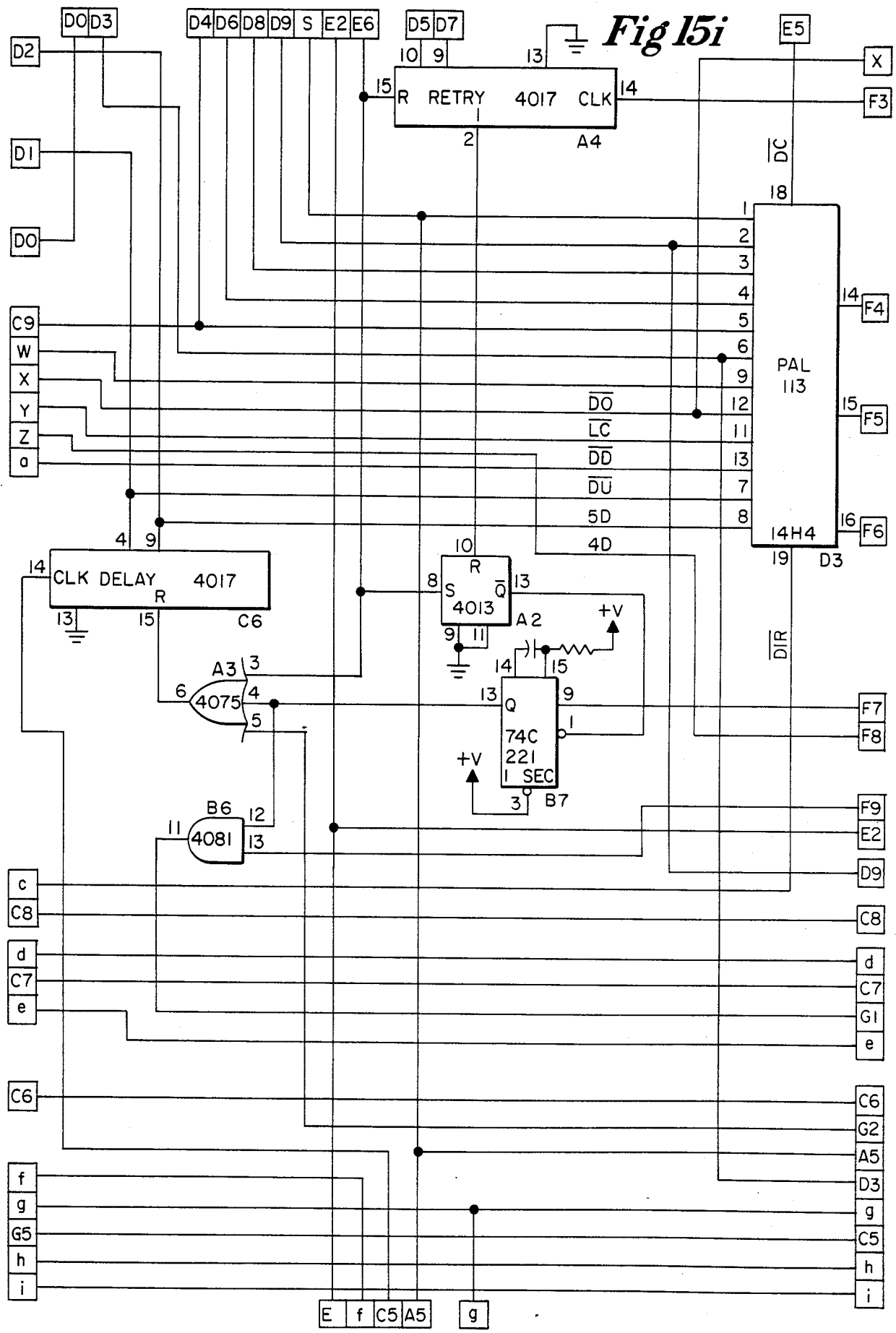

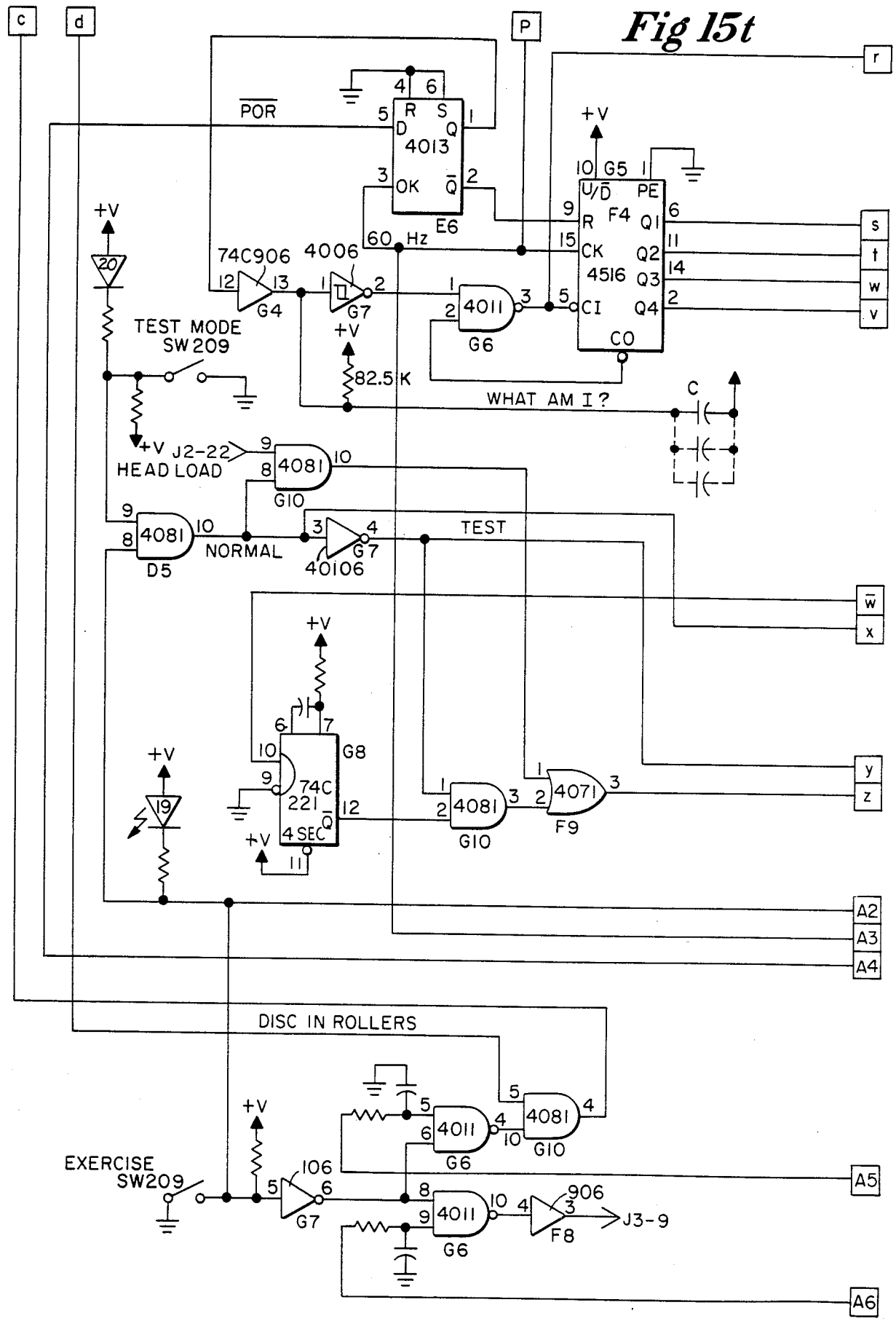

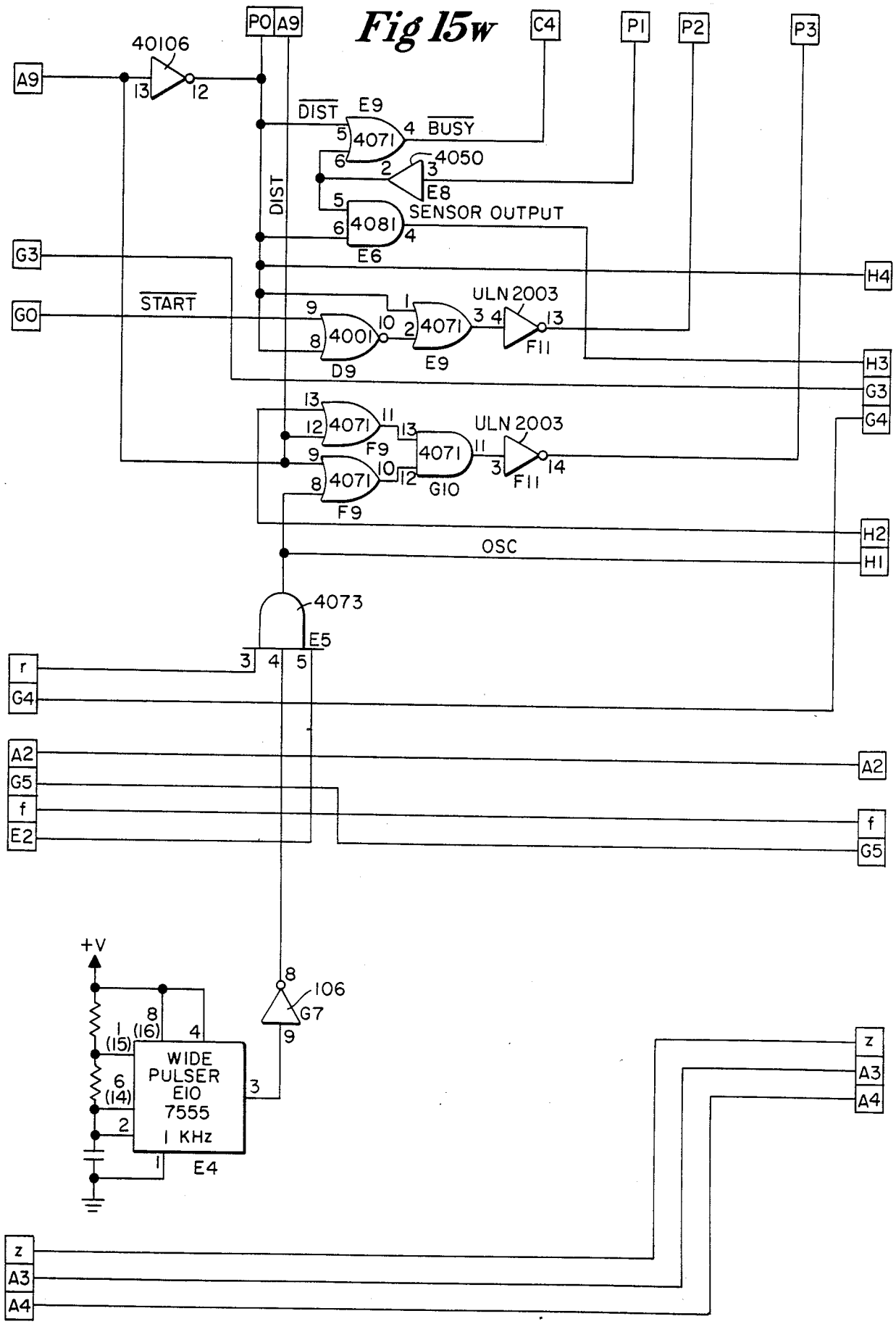

*Fig 16*

| | | Fig.15s | Fig.15z |
|---|---|---|---|
| Fig.15f | Fig.15l | Fig.15r | Fig.15y |
| Fig.15e | Fig.15k | Fig.15q | Fig.15x |
| Fig.15d | Fig.15j | Fig.15p | Fig.15w |
| Fig.15c | Fig.15i | Fig.15o | Fig.15v |
| Fig.15b | Fig.15h | Fig.15n | Fig.15u |
| Fig.15a | Fig.15g | Fig.15m | Fig.15t |

HORIZONTAL FLEXIBLE DISK LOADING AND SORTING/COLLATING MECHANISM

This is a continuation of application Ser. No. 402,841, filed July 29, 1982 and now abandoned.

This invention relates to means for handling magnetic floppy disks and paticularly for loading same into a reading/writing station and sorting/collating the same based upon tests performed at the reading/writing station.

Various means have been devised for handling floppy disks while they are being processed for various reasons. One such devise is that disclosed in U.S. Pat. No. 3,846,836 entitled "Loading and Unloading Mechanism for Flexible Magnetic Disks". A more detailed disclosure of the apparatus for clamping and centering a flexible magnetic disk is disclosed in U.S. Pat. No. 3,768,815 owned by International Business Machines Corporation. The flexible disk is disclosed in more detail in U.S. Pat. No. 3,879,757, also owned by International Business Machines Corporation.

Most flexible disk drives have a cone shaped lock collet means to grip the disk around its internal diameter bore which is disclosed in U.S. Pat. No. 3,768,815 set out above. The drives for the disk vary as to the degree the disk's inside diameter needs to be prepositioned before clamping in order to prevent mashing the disk in the area around the inner diameter bore or hole. During manufacture, floopy disks are first processed with the rear jacket flap unsealed so that the jacket can be reused in the event the disk itself is defective. With the diskette's jacket open, the disk is free to move beyond the normal confines provided by the jacket. Previously, if operators did not take special precautions to jog a stack of disks prior to loading into an a reading/writing means, the disks could be ruined. It has been found that those disks may be protected from damage when they are first rapidly accelerated by large elastomeric pinch rolls into the disk driver to minimize the load time, and then are gradually moved at a substantially slower pace into a position where the disk is positioned in the disk drive for reading and writing of data thereon.

Through the use of various sorter sections, the flexible diskette loading and sorting/collating system may be used with a varying number of sort bins and disk capabilities such that several sections may be easily linked together to serve various flexible disk inspection and processing applications.

SUMMARY OF THE INVENTION

The flexible disk loading and sorting/collating mechanism of the present invention comprises at least one handler station which may or may not be under the control of a host computer and which consists of three interconnected modular units, namely, a diskette picker unit, a loader unit and a sorter unit. Working together, these units automatically load, process, sort and collate flexible diskettes or floppy disks. The picker unit is capable of selecting the bottommost diskette from a stack of such diskettes in an input hopper and feeds that selected diskette to the reversible drive rollers of the loader unit. The loader unit automatically feeds the diskette to a diskette handler where, if conditions are met, the diskette is clamped to a spindle and made to spin relative to reading/writing transducing heads. In the loader, the diskette motion to the handler is under control of the aforementioned drive rollers whereby the diskette is first moved at relatively high speed into the drive and then at a substantially slower rate to a controlled stop. At this point, photosensing means are used to determine whether the magnetic recording medium is properly positioned within its open jacket and, if not, the drive is disabled and the disk is made to exit the loader and travel to a null sort location without being clamped. If the recording medium is properly positioned within its jacket, however, the diskette becomes clamped on the drive and is rotationally driven thereby. Once in the drive, predetermined tests are performed to, for example, first certify the quality of the magnetic surface on the diskette and then to determine the quality of the recording on the diskette itself. Depending upon the outcome of the test, the reversible drive rollers of the loader first eject the tested diskette along a path other than the one over which it entered the loader and it travels along a conveyor line to one of a plurality of bins which is selected on the basis of the test results. The position of the floppy disk on the conveyor is monitored by an encoder and counter and when the contents of the counter equal a digital address of the bin which is to receive the diskette, a deflector moves the diskette into that bin.

The system of the present invention also incorporates certain self-diagnostic features. Specifically, in the event that certain operations fail due to transient (soft) errors, the system "retrys" automatically and a counter captures the number of retrys for display to maintenance personnel. In the event of a jam condition, the flexible diskette handler of the present invention attempts to clear the abnormality and null sorts the diskette being processed at the time of the jam condition. In a null sort, no determination is made as to whether the diskette in question is good or bad and the null-sorted diskette is merely ejected past the end of the sorter line rather than being diverted into one of the plural sort bins.

Furthermore, sensors are incorporated in the system for detecting when the hopper of diskettes being picked from is empty and when any of the sort bins is filled to capacity.

OBJECTS

It is an object of the present invention to create both a logical bin and a physical bin through the use of this concept, the logical bin occurs in time ahead of the physical bin location permitting time to check the prerequisite operation and provide for several retries upon any of those operations being rejected. If a jam is eminent, it also allows time to shut the mechanism off.

It is yet another object of the present invention to use a null-sort concept which is a bin address greater than the length of the sorter in order to provide means to eject the floppy disks due to a jogged condition, or attempting to auto clear a jam, in which the power line AC transients have occurred, or where the logic suffers temporary and irreversible loss of memory.

It is yet another object of this invention to provide a mechanism that will operate with both sealed and unsealed floppy disk jackets.

It is still another object of this invention to provide the use of logic means and a counter for totalizing the soft logic errors. This counter can be used to judge the extent of mechanism degradation need of repair and or adjustment well ahead of total failure.

It is still another object of this invention to use two sensors per bin, one to sense a "pass" condition and the other to sense a "drop" condition, thus providing a means to determine a possible jam or sort error.

It is still a further object of this invention to use spring clips to hold shaft bearings in half moon bores so that the entire shaft assemblies can be easily preassembled and/or removed.

It is yet another object of the invention to provide a picker unit which may be attached to a sort section in which a magazine hopper is removable for loading off the line.

It is still another object of this invention to provide a means for moving the disk by the use of pinch rolls wherein the floppy disk is moved into the drive and then slows to a controlled stop. The position of the internal diameter of the hole is sensed and if improper, the disk is null sorted.

BRIEF DESCRIPTION OF THE DRAWINGS

A detailed description of one preferred embodiment of the HORIZONTAL FLEXIBLE DISK LOADING AND SORTING/COLLATING MECHANISM is hereafter described with specific reference being made to the drawings in which:

FIG. 1 is a prospective view of the loader on the left connected to the sorter on the right;

FIG. 2 is a top plan view of the machine disclosed in FIG. 1;

FIG. 11 is a bottom plan view of the picker portion of the sorter unit lid;

FIG. 12 is a rear elevational view of the motor unit with back panel removed;

FIG. 16 is a diagram showing the placement of FIGS. 15a through z in a complete circuit.

DETAILED DESCRIPTION OF INVENTION

Figure 3:
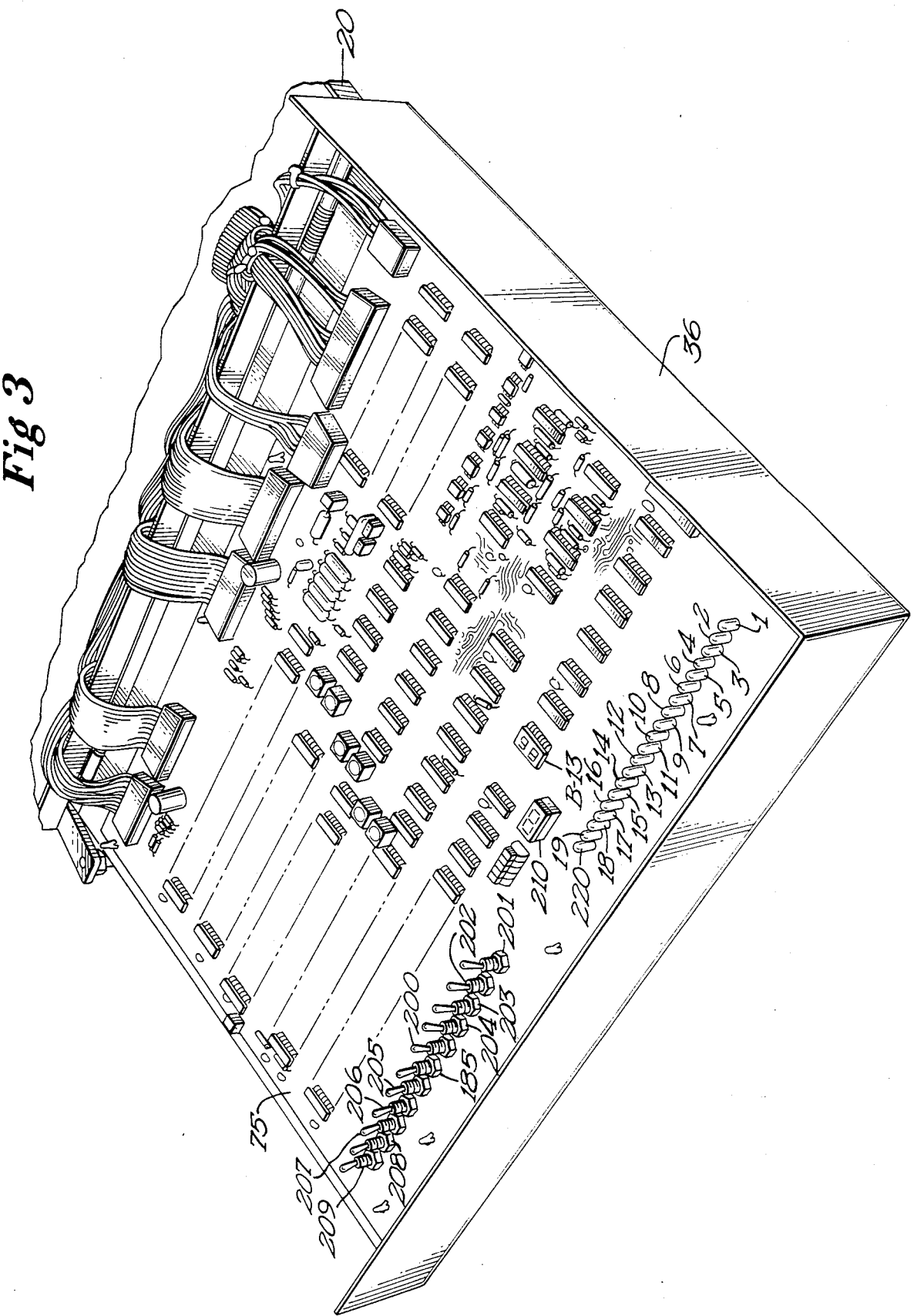
FIG. 3 is a perspective view of the inside of the rear swing down panel on the loader showing the logic circuit board.

Referring particularly to FIGS. 1 and 2, there is disclosed a loader 20, a sorter 21, a picker unit 22 including a hopper 23. Contained within hopper 23 are a plurality of floppy disks 24. Within the frame work of sorter 21 are five bins 25, 26, 27, 28, and 29.

Loader 20 has a power cord 30 to the power supplies and discloses a plurality of operator controls 31 that are formed within an outer door 32. Additionally, there are a plurality of adjustable feet 33 beneath loader 20 and a plurality of adjustable feet 34 beneath sorter 21. Sorter 21 is connected to loader 20 through the use of suitable means such as mechanically slide fasteners 35. A rear cover panel 36 is hingedly secured to loader 20 and contains the logic circuits for the loader and sorter (as shown in FIG. 3). An additional set of holes 49 are shown on the left of the cabinet to accommodate a wider sorter 21.

Two back panels 37 and 38 cover the mechanism as found in FIG. 2. Additionally, there is disclosed a handle 39 that may be used to pivotally rotate upper section 40 with respect to lower section 41 through a pair of hinges 42 and 43 (FIG. 6) to gain access to the sort plane for visual inspection and clearing of jams.

Figure 8:
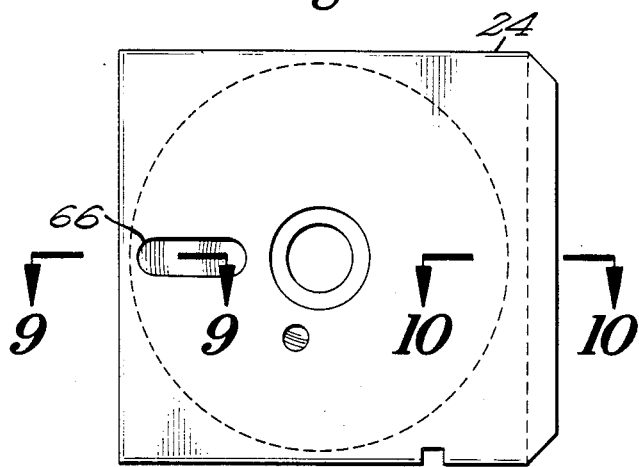
FIG. 8 is a plan view of a floppy disk cartridge.

Referring to FIG. 8, the mechanism is designed to unload and sort the illustrated standard 8 inch or 5¼ inch flexible diskettes, commonly known as floppy disks or other similar jacketed disks of differing characteristics, size, etc. One such floppy disk is shown with an open jacket in which the magnetic surface may be removed and replaced.

One of the functions of the loading mechanism is achieved through the use of a certifier test function that appears as plug-in circuit board 44 in FIG. 2. Circuit board 44 attaches to the upper portion of the floppy disk drive and the certifier provides massing pulse and extra pulse detection at dual threshold levels. The certifier board carries the programable logic used to select the bin into which a certified floppy disk will be directed. This can be specified by the user and can be changed by replacing a given chip in a socket. The logic may also be supplied by a computer in place of the certifier board. The computer must be used in conjunction with an EIA standard interface board.

Figure 13:
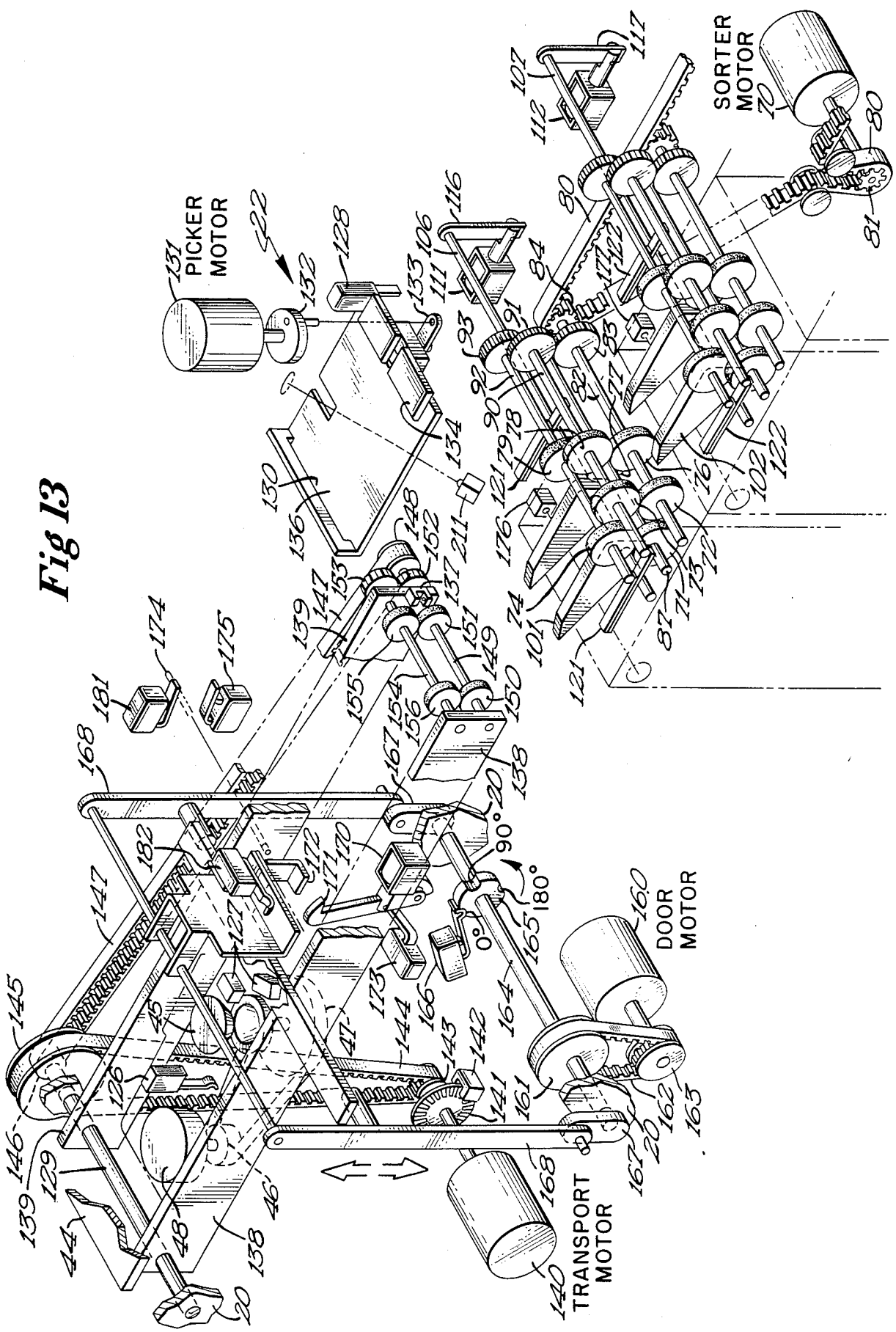
FIG. 13 is a schematic mechanical diagram of the loader and sorter units.

Various forms of floppy disk drives may be used in the equipment and it is shown schematically in FIG. 13 by a collet 45 that is driven through a drive belt 46 that drives a pulley 47 through a motor 48. Those different forms of drives may include the Shugart SA 400 and SA 450, the Tandon TM 100-4, the CDC 9409, 9409T all for a 5¼ inch drive and the Qume Data Track 8, the CDC 9406 and the Shugart SA 800/801, SA 850/851 which are all 8 inch drive mechanisms.

The loader-sorter contains two separate power supplies, one for the loader-sorter and one for the test functions that are set in circuit board 44. The supply for the loader-sorter includes a +5 v DC supply, a ±15 v DC supply, and a +24 v DC supply. The loader-sorter unit also operates on 120 volts AC.

Once it is determined that power should be applied to the loader, line 30 is plugged into a standard 120 volt grounded outlet. The AC power will appear as inputs to the circuit in FIG. 15x (hereinafter designated only by letter symbol x) and it also appears as an input on FIG. 1. Once power is applied to the loader, the loader will clear itself to the "ready position". That is, some of the motors will operate so that the "ready position" can be attained. If a disk 24 is in the loader 20 at the time power is applied, it will be null sorted or ejected past bin 29 of the sorter unit. When the "ready position" is attained, the Master Clear Indicator 50 of operator controls 31 (FIG. 2) will be deenergized. The Halt Indicator 51 will be energized.

Figure 15A:
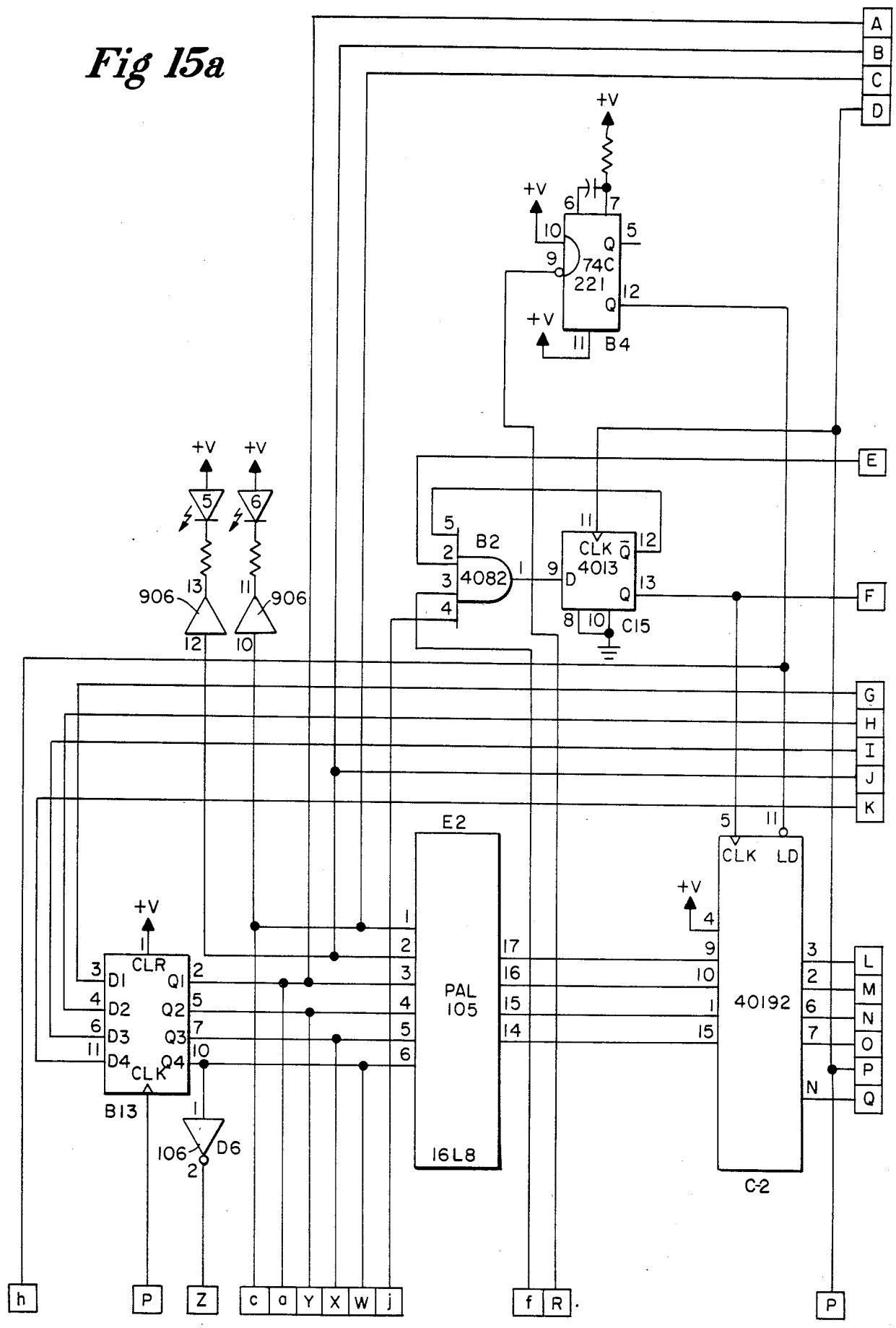
FIGS. 15a through 15z show the logic diagram of the loader and sorter, the schematic diagram of the motors and sensors, and all of the interconnected associated circuits.

With continued reference to FIG. 2, the additional switches and indicators are designated as the Run Indicator 52, the Cycle Indicator 53, the Hopper Empty 54, the Load/Unload (step) Indicator 55, the Load Jam Indicator 56, the Bin Full Indicator 57; the Sort Clear Indicator 58; a Sort Jam Indicator 59; and a Sort Error Indicator 60. There also appears on the upper face of panel 32, five sorter bin indicators numbers 61, 62, 63, 64 and 65 into which floppy disks 24 may be directed. The later bin indicators are also shown in FIG. 15m and the indicator lamps are shown in FIGS. 15s and 15z.

Figure 7:
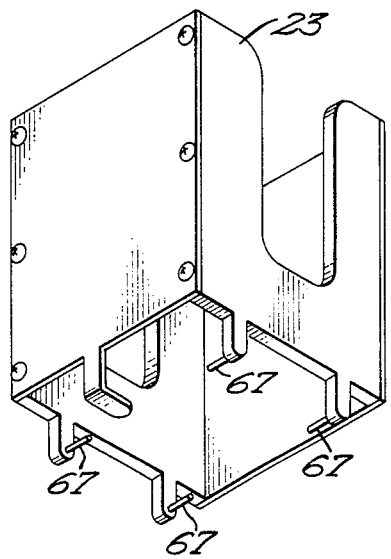
FIG. 7 is a floppy disk cartridge hopper shown in isometric view as seen from the front right, and below position.

The hopper 23 is loaded with floppy disks 24 wherein the head window in the floppy disk 66 (FIG. 8) is directed towards the loader 20 with the jacket folds facing downwardly. If open jacket floppy disks 24 are put in hopper 23 upsidedown, the picker will not pick the disks. As shown in FIG. 1, the hopper 23 sits on top of sorter 21 adjacent the loader 20. By pulling upwardly, hopper 23 may be removed with the floppy disks 24 being supported by a plurality of depending fingers 67 (FIG. 7).

The loader circuit board 75 is shown in FIG. 3 and is located on a fold down portion of panel 36. CMOS Logic is used wherever possible to provide increased noise immunity and low power consumption.

Figure 4:
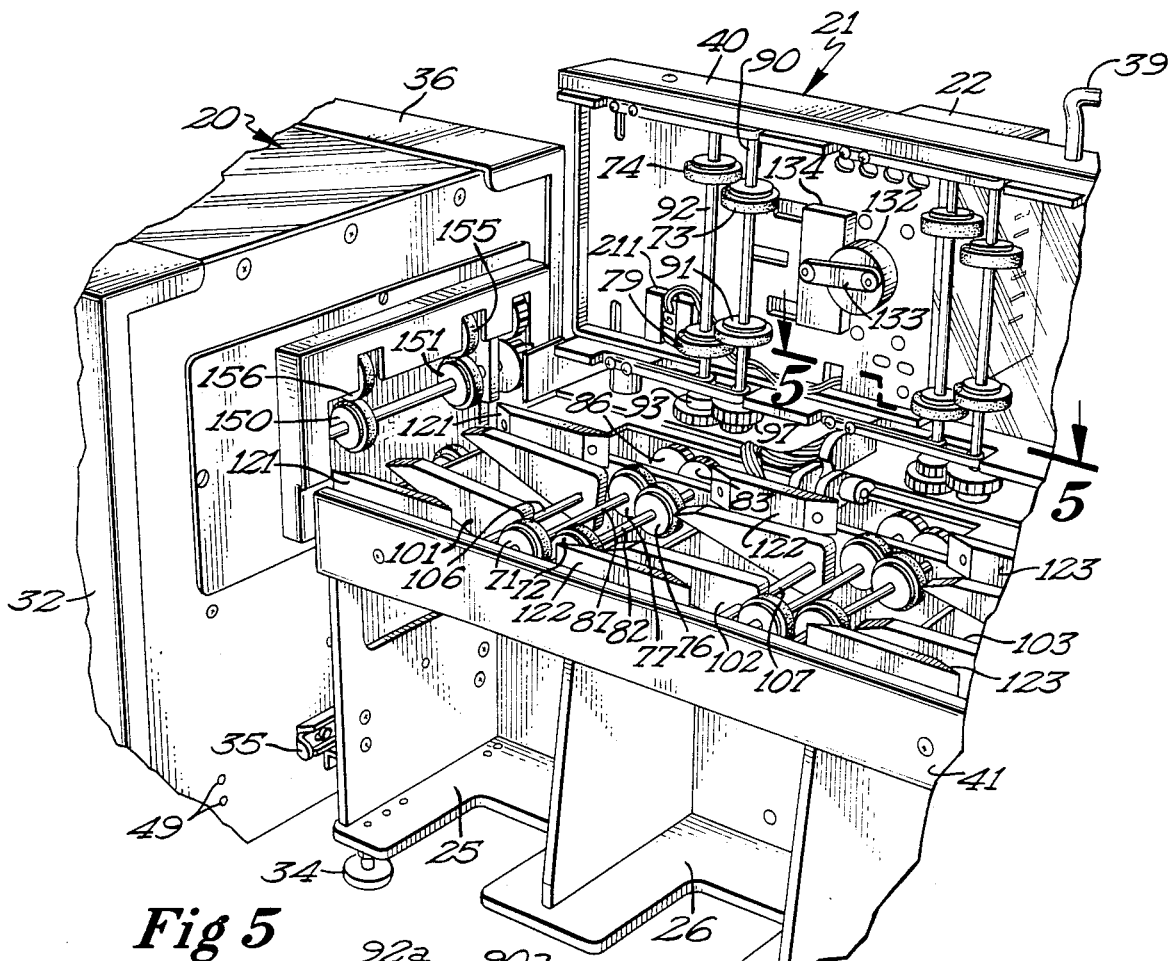
FIG. 4 is a partial perspective view of the sorter and loader connected.
Figure 6:
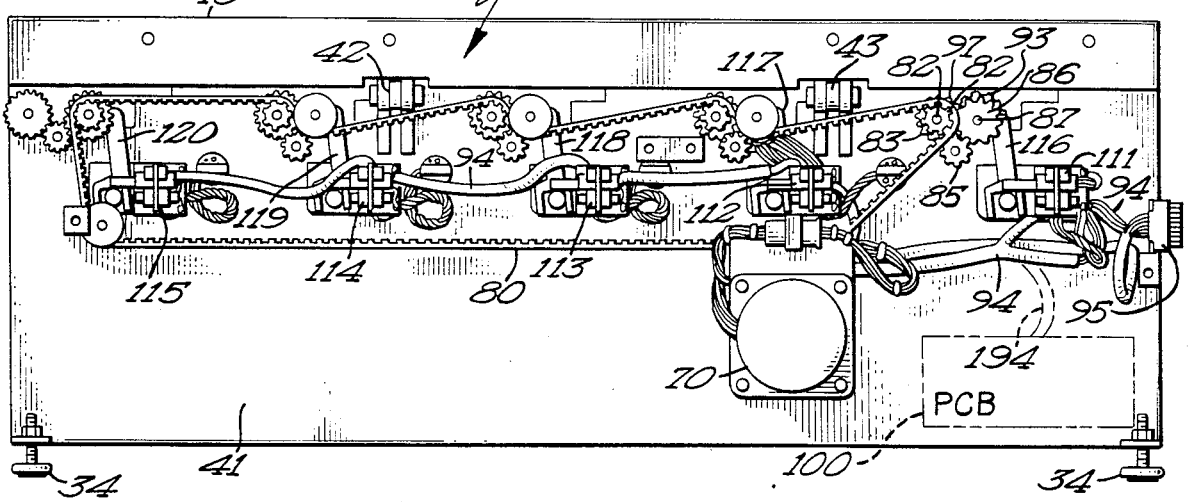
FIG. 6 is a rear elevational view of the sorter mechanism with the covers removed.

There are three types of sorters available that can be attached to the loader 20. The loader 20 contains circuitry to determine which type of sorter is connected to it so that it can send the appropriate signal to a bin. One such sorter is that such as shown in FIG. 1 containing bins 25, 26, 27, 28 and 29 and is known as a five bin slave sorter. As shown in FIGS. 2, 4 and 6, sorter 21 has its own sorter motor 70 to power a plurality of pinch rollers 71, 72, 73 and 74 at the front of the machine while live pinch rollers 76, 77, 78 and 79 are driven at the rearward portion of the sorter. In other words, motor 70 drives each of the rollers just described through a timing belt 80 connected with a driving sprocket gear 81. That is, pinch rollers 72 and 76 are on a common shaft 82, that includes a pair of driven gears 83 and 84. The timing gear 84 (FIG. 6) is in direct drive with belt 80. Gear 83 drives an idler gear 85 that in turn drives a gear 86 that has a common shaft 87 with rollers 71 and 77 attached. In a similar manner, a common shaft 90 has a driven gear 91 in communication with gear 83. Pinch rollers 74 and 79 have a common shaft 92 that is driven through a gear 93 that communicates with gear 86. Thus anytime the pinch rollers are in communication with each other, any disk 24 passing therebetween will be propelled in the appropriate direction in a controlled manner.

Figure 5:
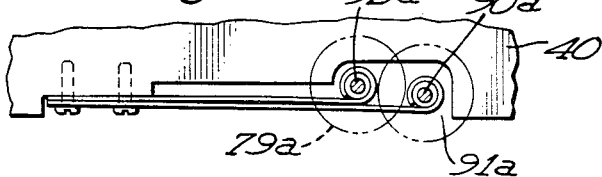
FIG. 5 is a sectional view of the loader lid pinch rollers taken along line 5—5 of FIG. 4 and enlarged therefrom.

As shown particularly in FIG. 5, a pair of leaf springs 88 and 89 are used to contain a pair of shafts 92a and 90a that are secured in a pair of journals 98 and 99. Springs 88 and 89 are secured in place by a pair of screws. That is, the spring action of springs 88 and 89 keep the pinch rollers under tension when cooperating with the lower pinch rollers to insure that the disks 24 are moved along the path of travel.

Motor 70 is controlled through the connections of an electrical cable 94 and a connector 95 that is secured to connector 96 on loader 20.

Disposed above each of bins 25 through 29 are respectively five different sets of fingers or flippers, 101, 102, 103, 104 and 105. Each of fingers 101 through 105 are controlled through a shaft 106, 107, 108, 109 and 110. Each of the shafts are under the respective control of a solenoid 111, 112, 113, 114 and 115. Each of those solenoids controls the respective shafts through a short torque arm 116, 117, 118, 119 and 120.

In addition to the mechanism just described, there are a plurality of disk slide blocks 121 through 125 (FIG. 4) working in pairs, that urge the floppy disks 24 into the center of the drive mechanism.

The sorter just described may also be connected to another sorter of the same type and up to 30 or more bins may be connected in series when used in this manner. Each sorter unit has its own circuit board 100 and cables 194, for connection of mechanisms to both the front feed and rear feed portions of the sorter and each board 100 controls the motor and the bin finger solenoids on its particular sorter module.

Figure 9:
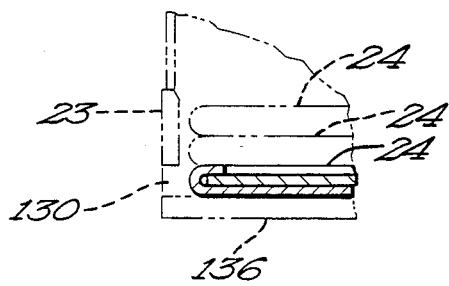
FIG. 9 is an elevational section view of a floppy disk cartridge taken from along line 9—9 of FIG. 8.
Figure 10:
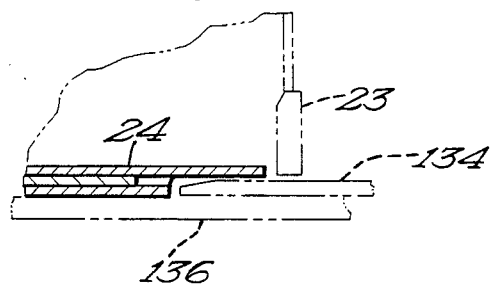
FIG. 10 is an elevational section view of a floppy disk cartridge taken along line 10—10 of FIG. 8.
Figure 14:
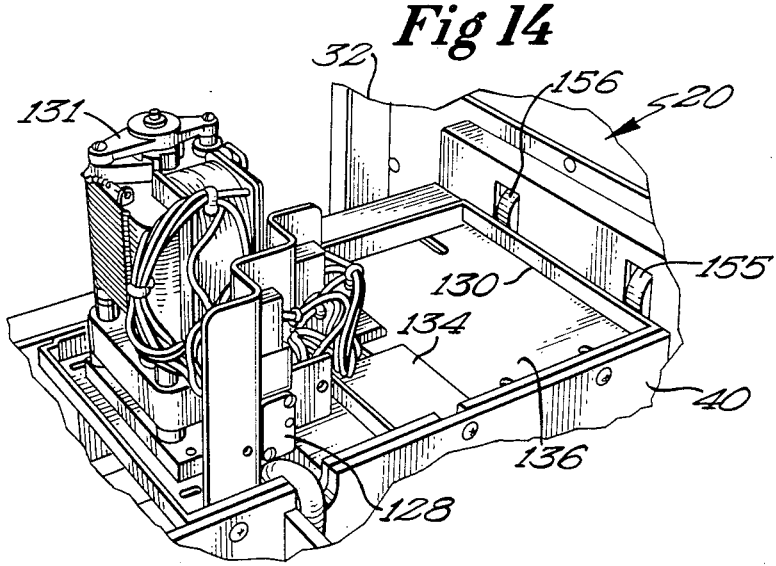
FIG. 14 is a perspective view of the picker motor with the cover removed and advanced one-half cycle.

A preliminary description of the loader and picker will now be set forth. As seen in FIGS. 13 and 14, the picker unit 22, working in conjunction with the hopper 23, moves a floppy disk 24 forwardly through a gate 130 that will allow only the bottom disk to pass and block the next higher disk. This is accomplished by a signal being sent to a picker motor 131 that has an eccentric drive 132 connected thereto. Drive 132 is connected to an arm 133 that moves the picker blade 134 forwardly through a slot 135 formed in the bottom of the slider bed 136 for containing hopper 23. It will be noted in FIG. 9, that blade 134 is configured so that it will pick only one disk of either an open or closed floppy disk jacket and propel that floppy disk 24 through gate 130 (FIG. 10). If the open floppy disk jacket is inverted (the opposite of FIG. 10) picker blade 134 will still be under the unbent flap of the jacket and will not engage the disk to move it through gate 130. As floppy disk 24 moves into the loader, it first moves past a pick-opto sensor 137 the function of which will be explained more fully later. As the floppy disk moves further, it will be noted that a pair of drive mechanism support arms 138 and 139 are in their upward position, pivoting about a common shaft 129. As the floppy disk moves further into the drive mechanism, it will eventually reach the position where collet 45 will be closed and the disk will be turned through drive motor 48, and its associated belts and drive pulleys. In keeping with the movement of the floppy disk 24 as it moves past the pick-opto sensor 137, it is moved through the efforts of a loader motor 140 that drives an encoder wheel 141 having 40 slots in the wheel and as it rotates it blocks or permits light to pass between a pair of light emitter and sensor arms forming a part of a roller encoder sensor 142. Additional information will be given about sensor 142 at a later time. Motor 140 also drives a timing gear 143 and associated belt 144 in either direction to produce movement of the floppy disk 24 in either direction. Moving the timing belt 144 produces movement of a pulley 145 that is secured to shaft 140 and through the use of an attached pulley 146, a second timing belt 147, which passes around a pulley 148 is driven both forwardly and in reverse. The later pulley is connected to a shaft 149 to which a pair of rollers 150 and 151 are secured. A gear 152 is also connected to shaft 149 and meshes with another gear 153 to produce movement of a common shaft or axle 154 that has a pair of pinch rollers 155 and 156 secured thereto. It should be noted that shafts 149 and 154 are secured to guide brackets 138 and 139 and move therewith.

Upon the processing, i.e. writing and/or reading on a newly loaded floppy disk that is to be driven by drive motor 48, door-open motor 160 is commanded to rotate and does so to drive a pulley 161 through a timing belt 162 that is connected to a timing pulley 163 of motor 160. Upon pulley 161 rotating, a shaft 164 is caused to turn and a cam 165 actuates a switch 166 upon reaching a 90° division of rotation. Upon shaft 164 turning an additional 90°, a pair of crank arms 167 will be extended downwardly and in so doing, drive frame members 138 and 139 will also be in a "down" position through the movement of a pair of arm members 168 on each side of the mechanism. When cam 165 reaches the 180° position, a solenoid latch mechanism 170 is engaged that causes a latch pawl 171 to engage a latch arm 172 and hold the same in place as long as solenoid 170 is energized. Upon cam 165 reaching the 270° position, the disk is now aligned to be sent outwardly into the sorter mechanism. That is, when the disk is first sent to the loader, it appears in an elevated position and is moved into the drive mechanism and then pivoted lower so that the sorter may then take over and direct the floppy disk to its proper bin position. As the floppy disk 24 moves into the sorter, five electro sensors 176, 177, 178, 179 and 180 are used to tell the operator if the bins are full. (See FIGS. 13 and 15p)

It will also be observed that as latch pawl 171 engages latch arm 172, a switch 173 is energized. When the mechanism reaches that condition, a striker pin 174 that is secured in frame member 139 actuates a switch 175. With the mechanism in the position shown, actuating pin 174 engages a switch 181. A further explanation of the operation of switches 165, 173, 170, 175, and 181 will be set forth in a later description. Another switch 182 is energized when the mechanism shown in FIG. 13 is in its "up" position.

If equipment is in a "ready" condition, the operational sequence will be described very briefly as follows:

STEP 0—This step checks the condition of all sensors to insure that everything is proper to begin operation.

STEP 1—This step starts the rollers 150, 151, 155 and 156 in operation on the front of the loader and verifies the speed of roller motor 140.

STEP 2—This step picks a floppy disk 24 from input hopper 23 and verifies that the sensors 137 and 127 are operating as the floppy disk moves by. It also verifies that a floppy disk was picked.

STEP 3—This step waits for a floppy disk to go all the way into the drive and verifies that the magnetic medium in the floppy disk is all the way in the jacket. If either of these conditions is not satisfied, floppy disk 24 is ejected out the end of the sorter in a "null sort" operation.

STEP 4—This step closes the drive door and the collet 45 becomes engaged.

STEP 5—This step starts the rotation of the magnetic medium in the floppy disk jacket and waits for the write and/or read operation to finish.

STEP 6—This step opens the floppy disk drive door and addresses the sorter bin indicated by the previous operational function.

STEP 7—This step starts the rollers on the loader in the direction opposite to that in Step 1 and starts the sorter to feed floppy disk 24 from loader 20 to sorter 21. This step also sets solenoid 170 to hold the drive in the "down" position while the floppy disk is exiting from the drive mechanism.

STEP 8—This step releases the solenoid 170 and mechanical latch 171.

STEP 9—This step lifts the drive mechanism back to the ready position and returns the mechanism electrically to Step 0.

CIRCUIT CHIPS

In the course of describing the various portions of the circuits, reference will be made to a number of circuit broad chips which are designated generally as the PAL chips and the FDAF chips. For further information on the PAL chips reference may be had to U.S. Pat. No. 4,124,899 which generally describes the programable array logic that is incorporated in the different chips. The PAL family utilizes an advanced Schottky TTL process and the Bipolar Prom fusible link technology to provide user programable logic for replacing conventional SSI/MSI gates and flip-flops. One such disclosure of the PAL chips is made in a Bipolar LSI Data Book copyrighted 1980 by Monolithic Memories Incorporated, 1165 East Arques Ave., Sunnyvale, Calif. 94086. The PAL 105 is an octal 16 input and/or invert gate array. The PALs 111 and 112 are 16 H2 dual 16 input and/or gate arrays. PAL 113 is identified as a 14 H4 quad 14 input and/or invert gate array. A flexible disk autoload firmware (FDAF) 101 is designated as a 12 H6, and is a Hex 12 input and/or gate array used as the process function or EIA bin select chip. The FDAF 102 is a 12L6 which is a Hex 12 input and/or invert gate array which is used generally as the normal or test bin select logic. The FDAF 103 and 104 are both 16 L 8 octal 16 input and/or invert gate array devices that are used as the sorter type decoder and test mode encoder. The PAL 105 is used as the null sort encoder, the PAL 111 programs motor Steps 0-4 and PAL 112 programs loader Steps 5-9 while PAL 113 is identified as a loader retry logic chip.

In addition to the programable array logic, the logic circuit makes use of the MOS integrated circuits such as the following chips which are part of a 1978 National Semiconductor Corporation Handbook, 2900 Semiconductor Drive, Santa Clara, Calif. 95051 and they are designated as a synchronous 4-bit up-down decade counter 40192 BC. The circuits also make use of a Hex D flip-flop designated CD 40174BC that consists of 6 positive edge triggered D-type flip-flops where the output from each flip-flop is externally available. The former counter is described on page 2-201 and the later flip-flop is on page 2-198. Also used in the circuits is a dual monostable multivibrator generally designated a 74 C221 where each multivibrator features a negative-transistion-triggered input and a positive-transition triggered input, either of which can be used as an inhibit input and a clear input. This device is described on page 1-91.

Another chip which is used in the circuits is a Hex Schmitt trigger 40106BC. This device is described on page 2-189. Another National Semiconductor Linear Data Book published by National Semiconductor Corporation, 2900 Semiconductor Drive, Santa Clara, Calif. 95051 in 1981 discloses an industrial functional timer LM555C which is a highly stable device for generating accurate time delays. Another circuit used in the logic circuits is a monostable multivibrator with Schmitt-trigger inputs designated SN 74 LS121 through the use of the Schmitt triggering input circuitry, jitter free triggering from inputs with transition rates that are extremely low is obtained. These devices are disclosed in the TTL Data Book for Design Engineers published by Texas Instruments Incorporated, Post Office Box 5012, Dallas, Tex. 75222 and copyrighted in 1976.

The logic circuits also make use of an optocoupler isolator zero crossing Triac driver designated MOC 3040 or 3031. The device consists of a Gallium Arsenide Infrared emitting diode optically coupled to a monolithic silicon detector performing the function of a zero voltage crossing bilateral Triac driver. Such a device is manufactured by Motorola, Post Office Box 20912, Phoenix, Ariz. 85036 and is disclosed in one of their semiconductor specification sheets.

Another device used in the logic circuit is an AC/DC to logic interface optocoupler identified as an HCPL-3700. This optocoupler uses an internal light emitting diode, a threshold sensing input buffer IC, and a high gain photon detector to provide an optocoupler which permits adjustable external threshold levels. Such a device is manufactured by Hewlett Packard, 640 Page Mill Road, Palo Alto, Calif. 94304 and is disclosed in a 1980 Optoelectronics Designers Catalog published by Hewlett Packard.

The display retry device is designated as a Hewlett Packard 7415 device and displays some five different digits on the display board. The parts are designed specifically for calculators.

Another chip which has been used in the logic circuit is an MN9106 that is a non-volatile logic 6 decade up counter that is manufactured by Plessey Semiconductors Ltd., Cheney Manor, Swindon, Wiltshire, SN 22QW UK. Such a device is described in their publication number PS1723 dated November 1979. This counter is a six decade up counter and parallel with a 24 bit MNOS memory which can provide non-volatile data storage of the current count position. An overflow latch and memory bit are also available to indicate a counter overflow condition.

The Darlington driver configurations in the logic circuits are set out in a Sprague Electric Company Data Book WR-500, Volume 1, North Adams, Mass., the book being copyrighted in 1978 and on pages 411–413 disclose a series ULS2004H hermetically sealed high-voltage, high-current Darlington transistor arrays having series input resistors which allows operation directly with CMOS outputs utilizing supply voltages of 6 to 15 volts.

Additional circuits of the 4000 and 4500 series are also used and may be found in a number of handbooks, such as a CMOS Cookbook by Don Lancaster and published by Howard W. Sams & Co. Inc., 4300 West 62nd Street, Indianapolis, Ind. 46268 and copyrighted in 1977.

LOGIC CIRCUITS

The operation of the loader-sorter is based on a 10 step sequence just briefly described. A sequence counter, C2 (FIG. 15a) which may be a type 40192 presettable decade counter, in which the counter outputs go to the sequence display on the circuit board bracket and to a 4028 BCD 1-of-10 decoder C1 (FIG. 15b) controls the series of operations. The preset inputs to the sequence counter are controlled by a PAL (programable array logic) E2 and E1 (FIG. 15u) and are used only in the "null sort" mode of operation where the loader clears to the "ready" position, that is where it is prepared to load a floppy disk from hopper 23.

The ten steps that were just briefly described will now be set out in more detail, identifying each of the electrical devices for completing the operation.

It will also be observed that the signals used with the various gates, flip-flops, counters, etc may include a high or low going voltage. To help in understanding the operation, those low going signals are identified with a BAR under the symbols or words.

STEP 0

Figure 15B:
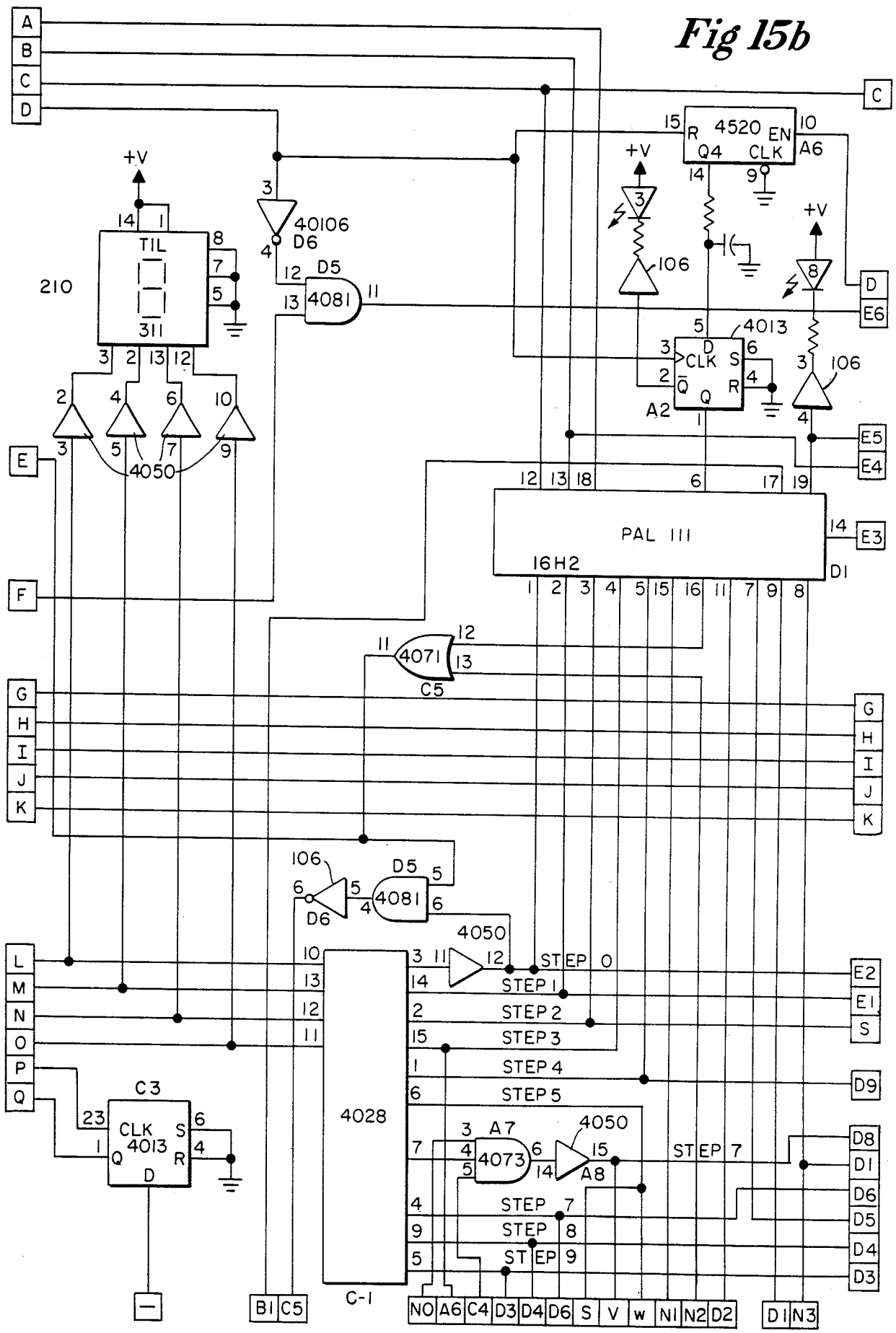

In FIG. 15b, the 4028 binary-coded-decimal to decimal decoder C1 produces an output at pin 3 that resets counters D14 and D16 (FIG. 3) and B17 (FIG. 15d) which determines the time to slow the loader rollers 150, 151, 155 and 156 when loading a floppy disk into the drive. The decoder C1 also presets the jogged counters B14 and B15 (FIG. 15k) and B16 (FIG. 15l). Output from pin 16 of PAL 111 decodes the next step.

STEP 1

Returning to pin 14 on C1, the signal starts the feed rollers at the front of the loader unit moving forward to feed a floppy disk 24 into the drive by setting C3, pin 8 (FIG. 15d) high, which puts C8-pin 10 (FIG. 15d) high that enables the triac circuit to start the transport motor 140. This signal also enabled C10, pin 10 (FIG. 15d) to put through the 15 Hz pulses on C10, pin 9 (FIG. 15d). This pulse is used (on upcoming step 3) to get the floppy disk in extact position in the disk drive.

STEP 2

Returning now to pin number 2 of C1 (FIG. 15b) a signal enables the pick motor 131 and D31 goes high. D3 is a PAL 113 designated a 14H4 that is a quad 14 input and/or gate array. At that moment pin 13 of C9 causes pin 14 of E15 to go high driving pin 13 of C9 to produce a pulse to the pick motor 131. This action turns on the triac driver (f) or E21 which is designated as a MOC3031 that turns on the triac for the picker motor. Before the short pulse disappears, the switch S128 (FIG. 15f) which is mechnically coupled to the picker blade 134 keeps the MOC3031 E21 in an "on" condition until the picker blade is back in its starting position. When the pick-opto sensor 137 (FIG. 15k) has its beam broken by a floppy disk 24 passing therethrough, the DISK IN ROLLER signal from pin 10 on E16 (FIG. 15e) goes low. PAL 111 (FIG. 15b) decodes the next step at pin 16 of D1.

STEP 3

Figure 15C:
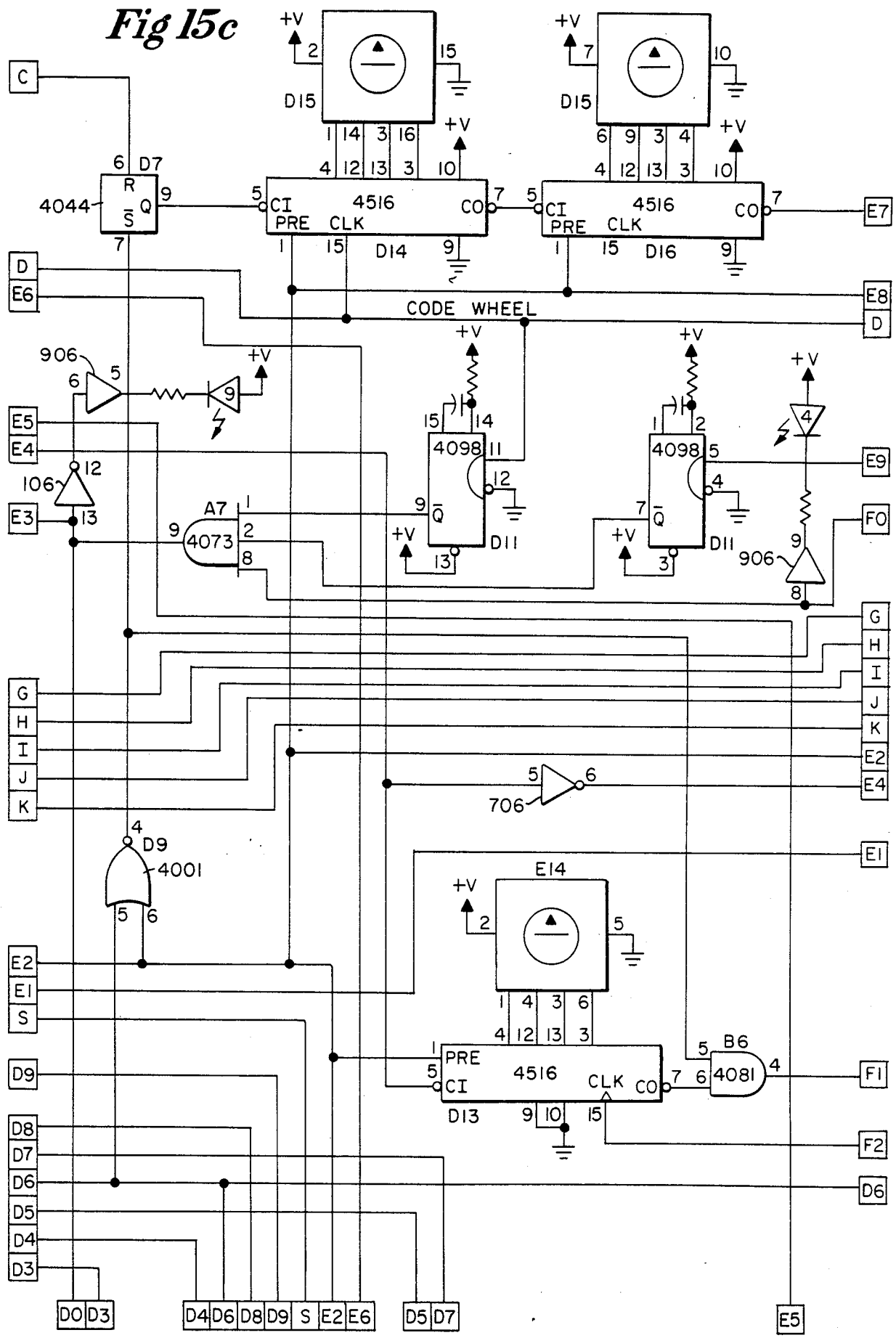
Figure 15D:
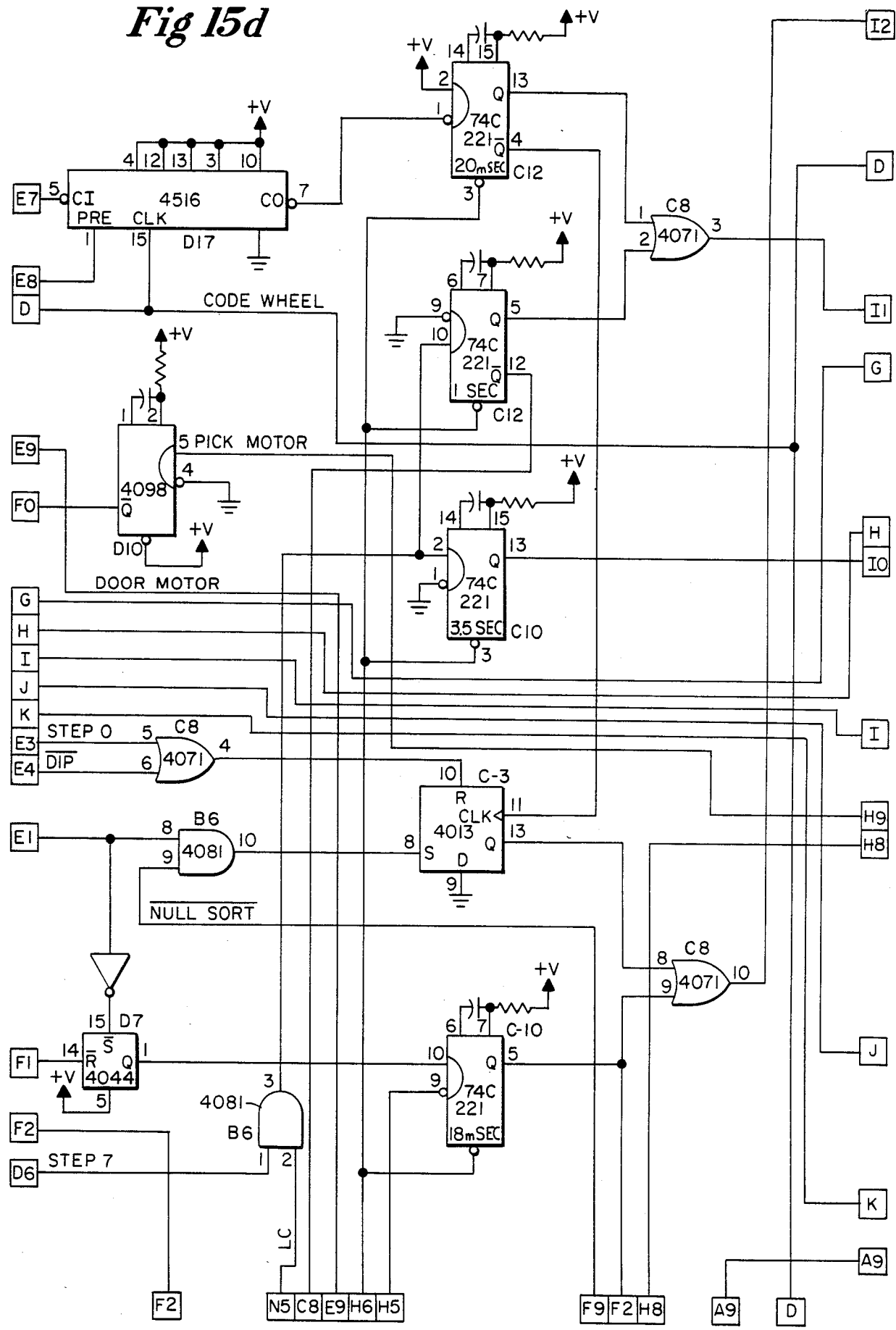

The next signal to initiate Step 3 comes from pin 15 of C1 (FIG. 15b) in which the DISK IN ROLLER signal resets the quad R/S flip-flop on pins 6 and 9 of D7 (FIG. 15c) which enables counters D14 and D16 of FIG. 15c and B17 (FIG. 15d). The counters are clocked by pulses from a code wheel 141 attached to transport motor 140. The Hexidecimal switches at D15 (FIG. 15c) are set so that the disk is within the drive but not to the DISK IN PLACE switch S126 when the counter overflows. When pin 7 of D17 (FIG. 15d) goes low, an 80 millisecond pulse is sent by pin 13 of C12 to reverse transport motor 140 (FIG. 15f). Since the forward winding of transport motor 140 is still energized, this produces a fast braking action of the motor. A high going pulse from pin 4 of C12 (FIG. 15d) causes pin 11 on C3 to clock C3, pin 13 low, turning off the brake. Now the forward direction is pulsed by a 10 millisecond pulse every 67 milliseconds from C10, pin 5 (FIG. 15d). This causes the motor to step in the forward direction. When the disk is in place, switch S126 completes the circuit and the DISK IN PLACE signal enables counter D13 (FIG. 15c) on pin 5. When the counter overflows, pin 7 of D13 goes low resetting D1 (FIG. 15b) and disabling the forward stepping of the roller motor 140 by bringing pin 10 low on C10 (FIG. 15d). The counter D13 (FIG. c) allows for exact placement of the floppy disk 24 in the drive.

JOGGED DISK CIRCUIT

Figure 15E:
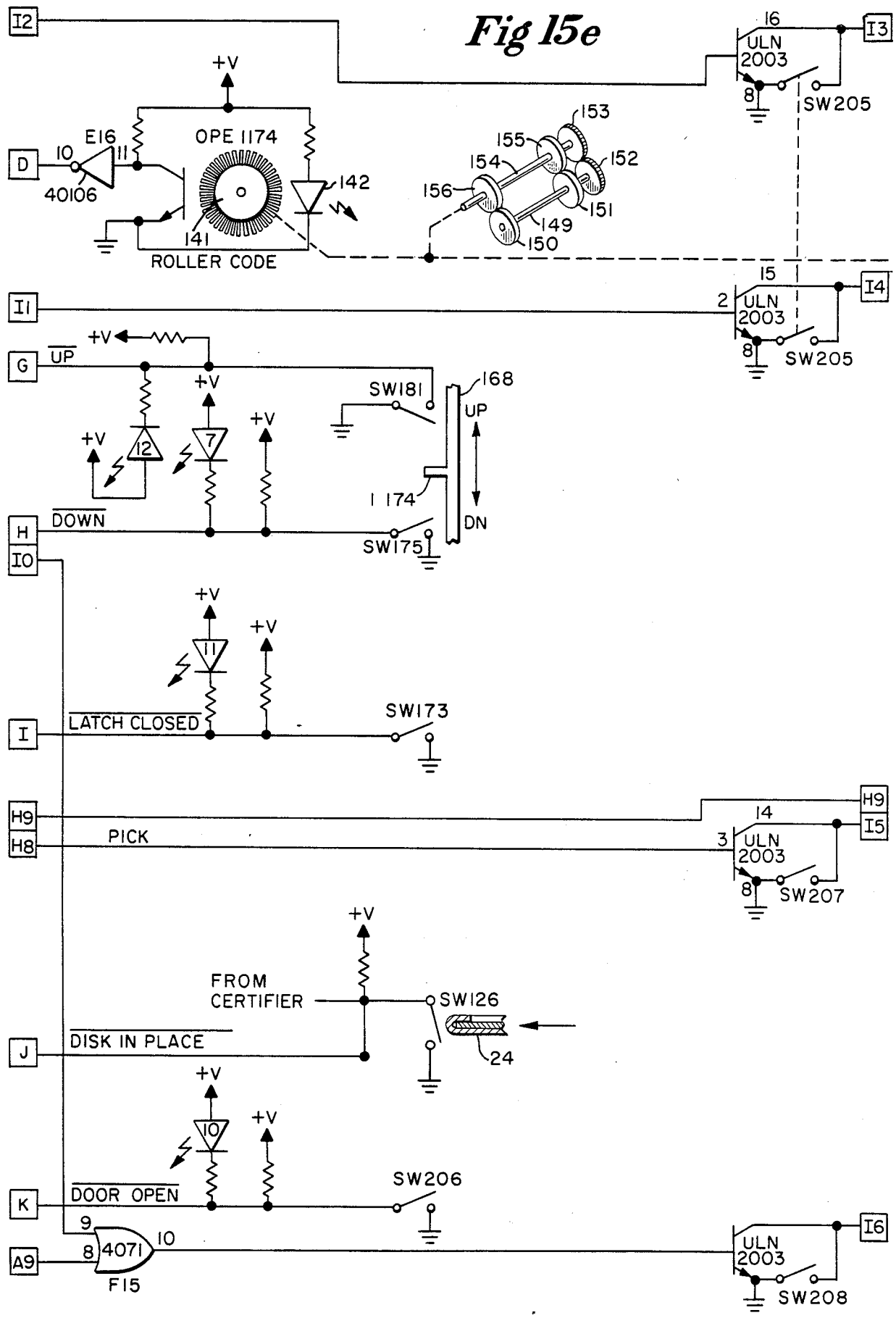
Figure 15F:
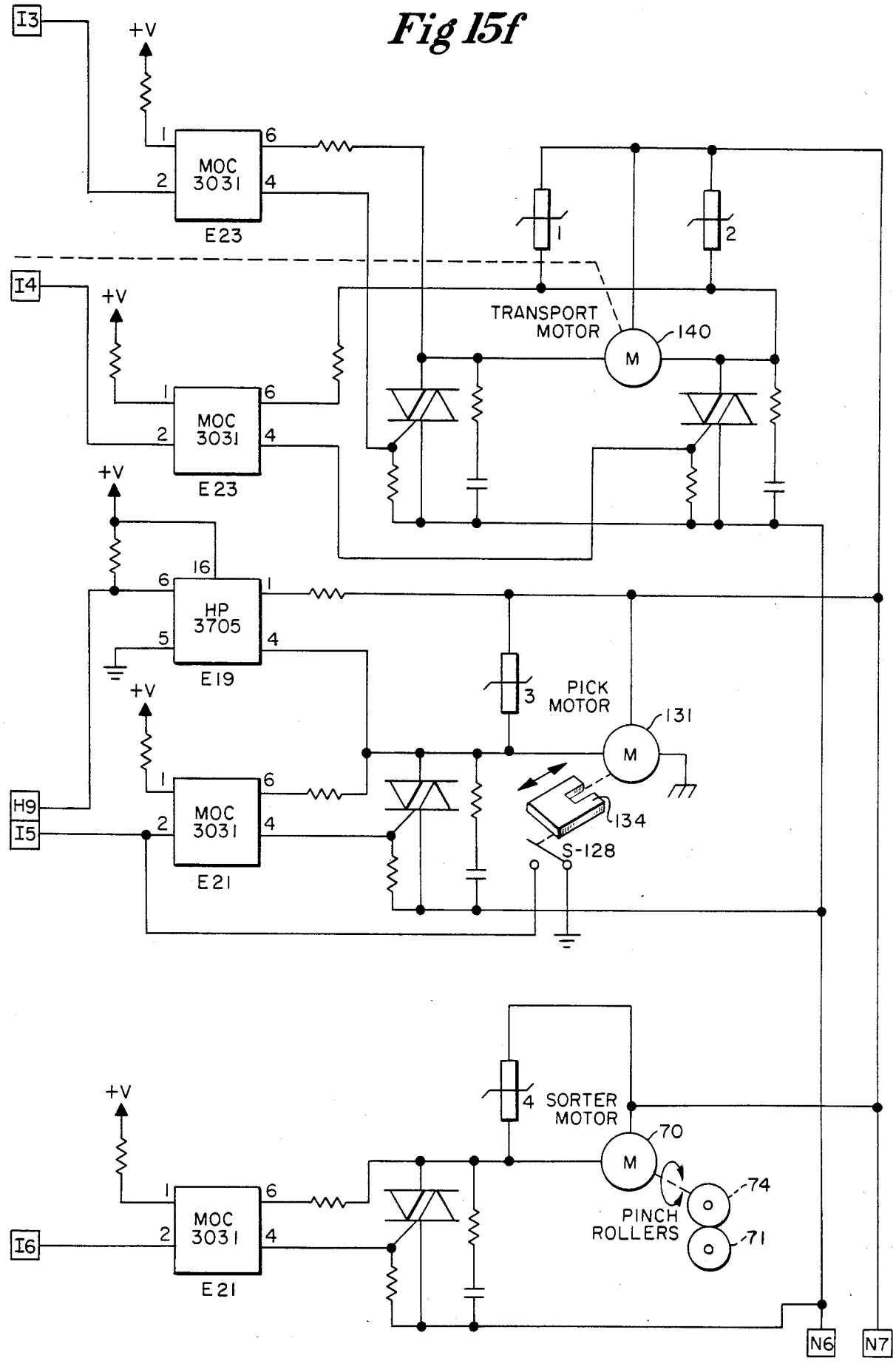
Figure 15G:
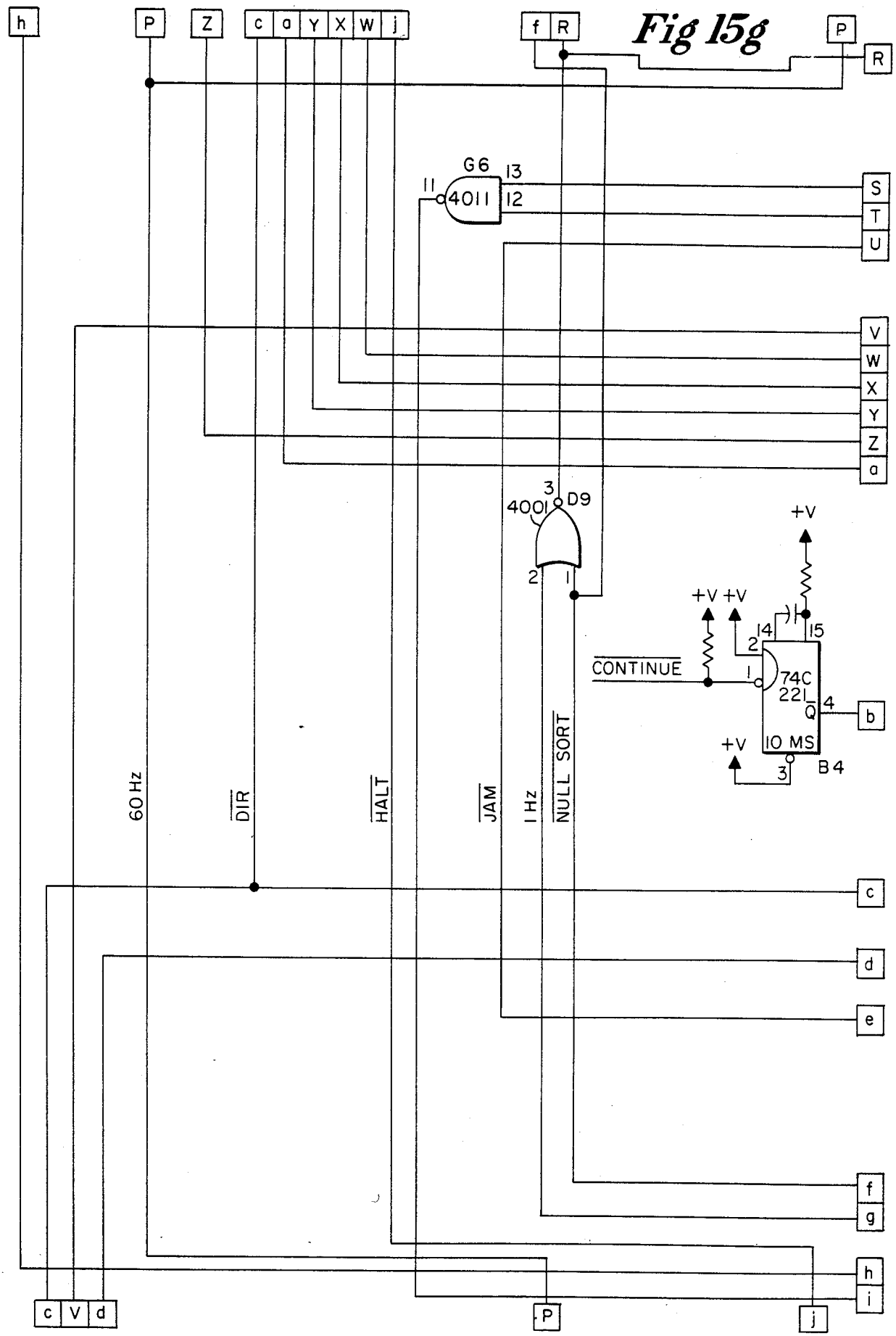

During Step 3, the floppy disk is checked to make sure that it is in the jacket properly when using open jackets. This circuit consists of an optical sensor 127 (FIG. 15k) mounted in the front center of the drive. When sensor 127 sees the jacket edge of the floppy disk coming in, pin 13 of latch A1 goes low enabling counters B14 and B15 (FIG. 15k). These counters set the minimum distance that pin 13 on latch A1 must stay low. The counters are clocked by the code wheel (FIG. 15e) on the roll motor 140. If light shows through the head window of the floppy disk, then C15 is clocked before pin 9 of the resettable flipflop A1 (FIG. 15l) is reset low by the counter overflowing. This action causes pin 13 of D21 (FIG. 15k) to go low and the JOGGED DISK signal from pin 4 of C18 will go low causing the loader to "null sort" and eject the floppy disk through the rear of sorter 21. If light does not show through the head window then counters B14 and B15 (FIG. 15k) will overflow, resetting the resettable flipflop pin 9 of A1 and enabling counter B16 (FIG. 15l). Switch C16 (FIG. 15k) sets the maximum allowable distance before the centerhole of the disk lets light through to sensor 127. If B15 (FIG. 15k) is not clocked to stop the code wheel pulses (FIG. 15e) from clocking the counter B16 (FIG. 15l) before it overflows, then pin 10 of C18 (FIG. 15k) will go low causing the JOGGED DISK signal at pin 4 of C18 to initiate a "null sort" signal and eject the disk beyond the end of the last bin of sorter 21. Therefore, if the floppy disk is not within any set limits inside its jacket, it is then ejected so that the center is not damaged when the door of the drive is closed and the collet 45 engages the interdiameter hole in the magnetic medium of the disk. PAL 111, pin 16 of D1 decodes the next step.

STEP 4

In Step 4, the binary-to-decimal-coder C1 at pin 1 (FIG. 15b) closes the drive door. The Step 4 signal is routed through PAL 113 D3 (FIG. 15i) to pin 10 of C9 and triggers a 0.3 second pulse which is applied to units 5 and 12 of E15 (FIG. 15k) to turn on the MOC3031, F19 (FIG. 15l) which in turn energizes the door motor 160. Door motor 160 is connected to a cam 165 that controls a switch 166. As long as the normally open switch 166 is closed and such is the case until it reaches a position 90° away, motor 160 will be energized until it reaches the 90° position.

If a "null sort" signal has been initiated from a JOGGED DISK signal, the loader will stop the door closing action when the drive is down and the door is open. The floppy disk 24 will be sent out the rear of the sorter. If a "null sort" signal has not been initiated, the door motor will continue to drive to the next cam indentation at 180°. When the door is open during Step 4, pin 13 of C20 (FIG. 15r) will retrigger C19-9 (FIG. 15j) when the cam switch 166 reaches the 180° position. PAL 111, a 16H2 at D1 (FIG. 15b) decodes the next step.

STEP 5

Pin 6 of C1 (FIG. 15b) waits for the disk drive to complete the test function. When a test mode switch 183 is closed, the step 5 signal generates an unload signal by triggering pin 12 of G8 (FIG. 15t) through G10, pin 3 (FIG. 15t). The unload signal is gated by pins 1, 2 and 3 of C22 (FIG. 15y) to B20, pins 4, 5 and 6 (FIG. 15y). To become Go-To-6 clock signal for pins 3 and 1 of B5 (FIG. 15h). PAL 112, pin 16 of D2 (FIG. 15h) decodes the next step.

STEP 6

Figure 15J:
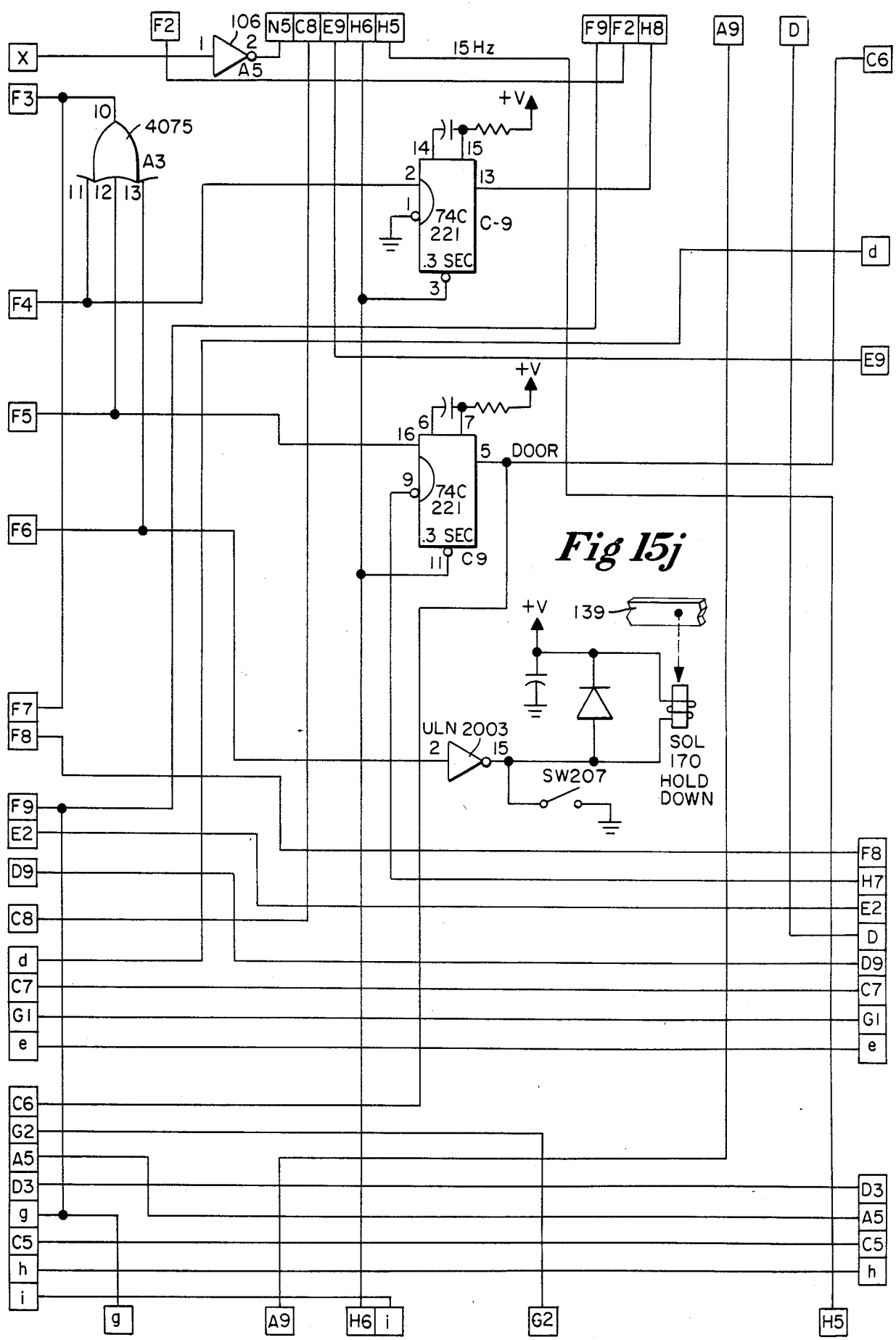
Figure 15K:
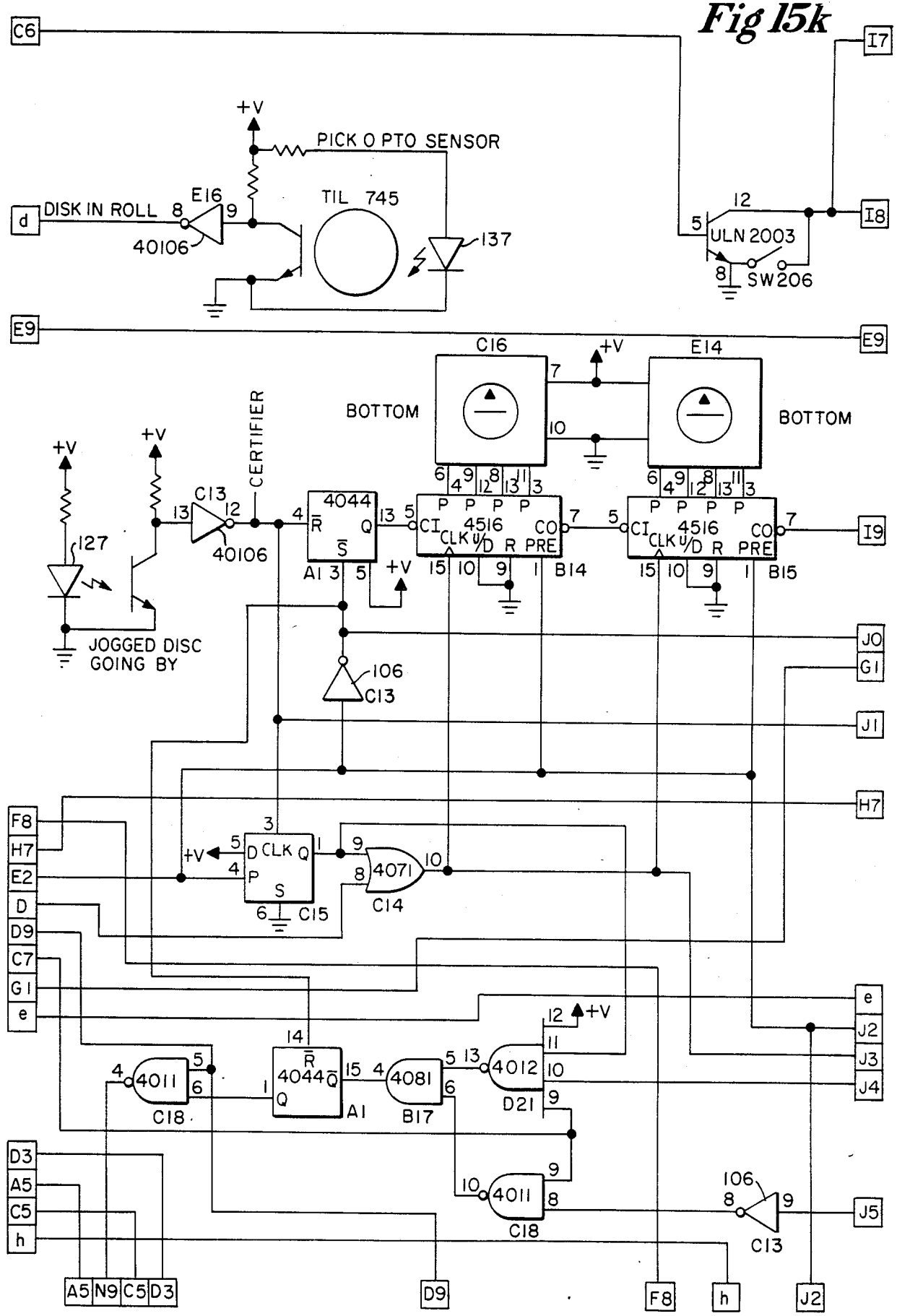
Figure 15L:
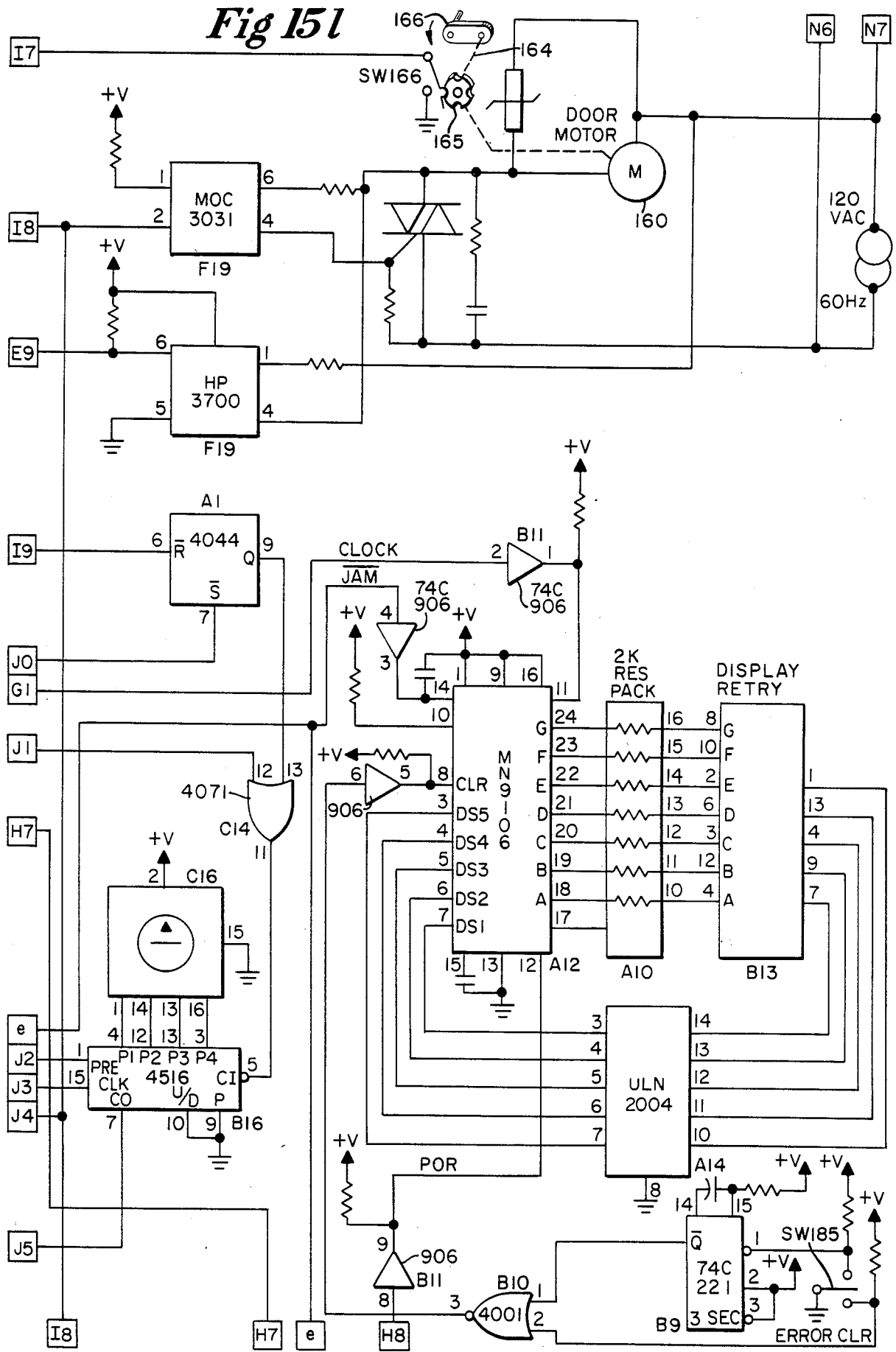
Figure 15M:
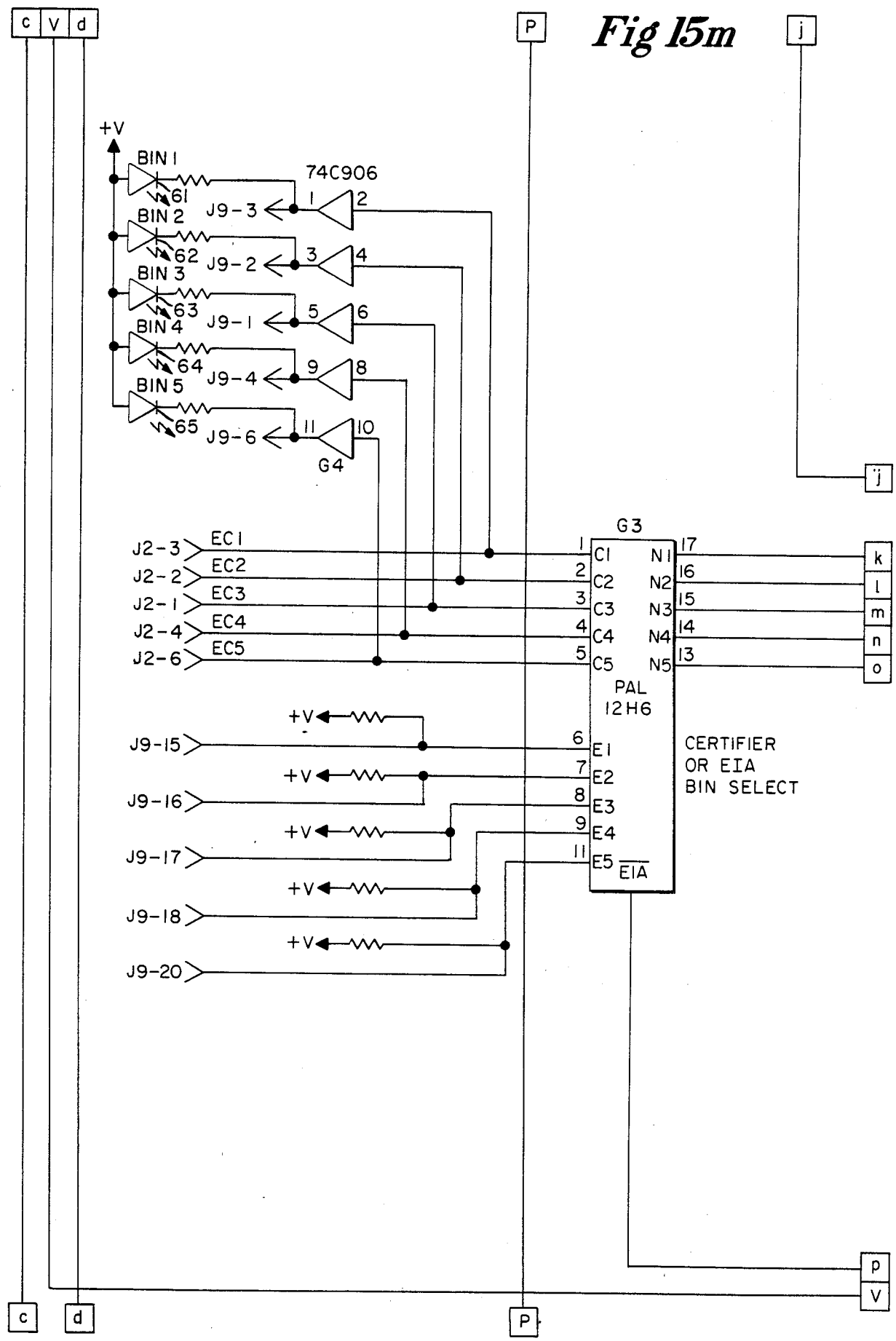
Figure 15N:
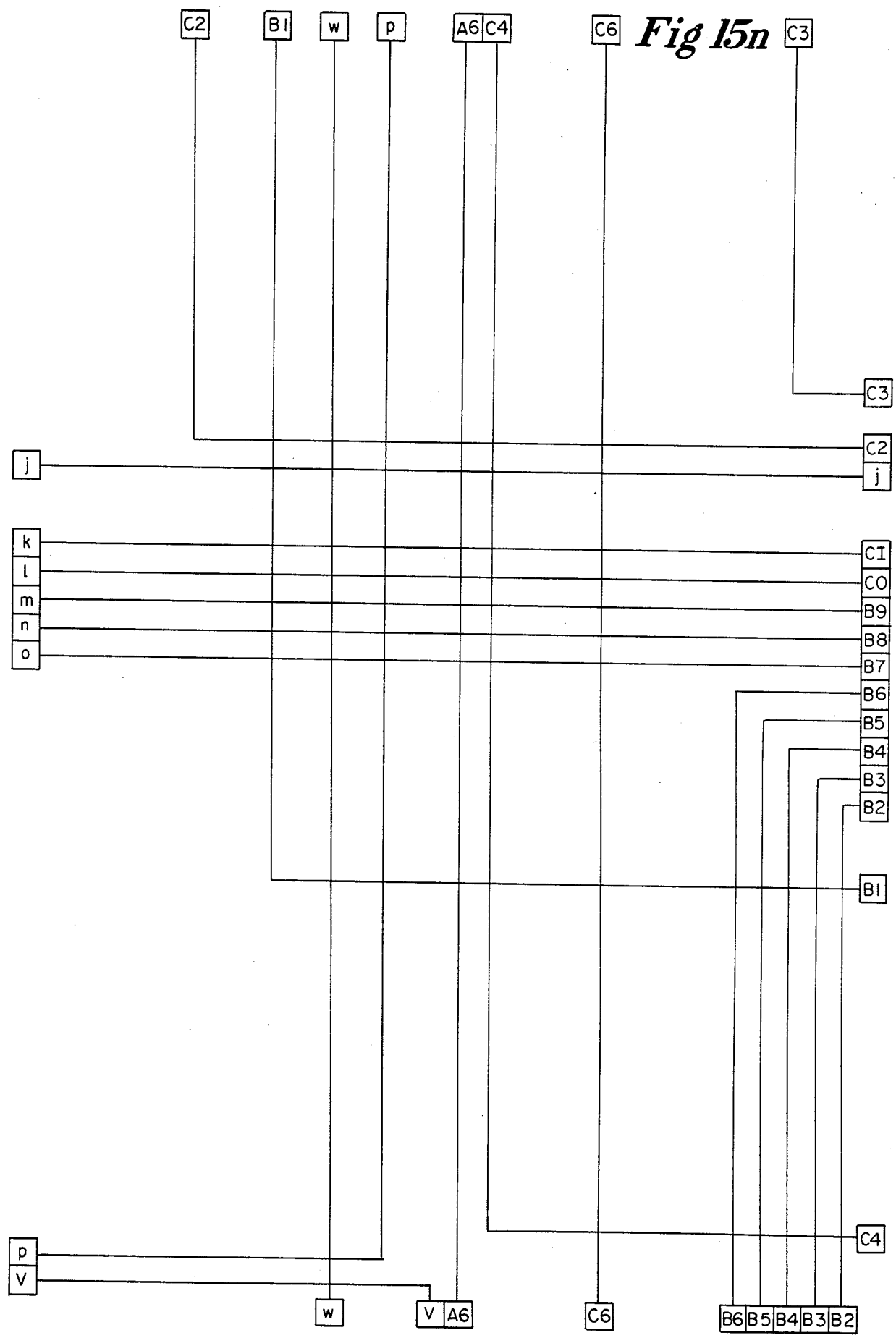
Figure 15O:
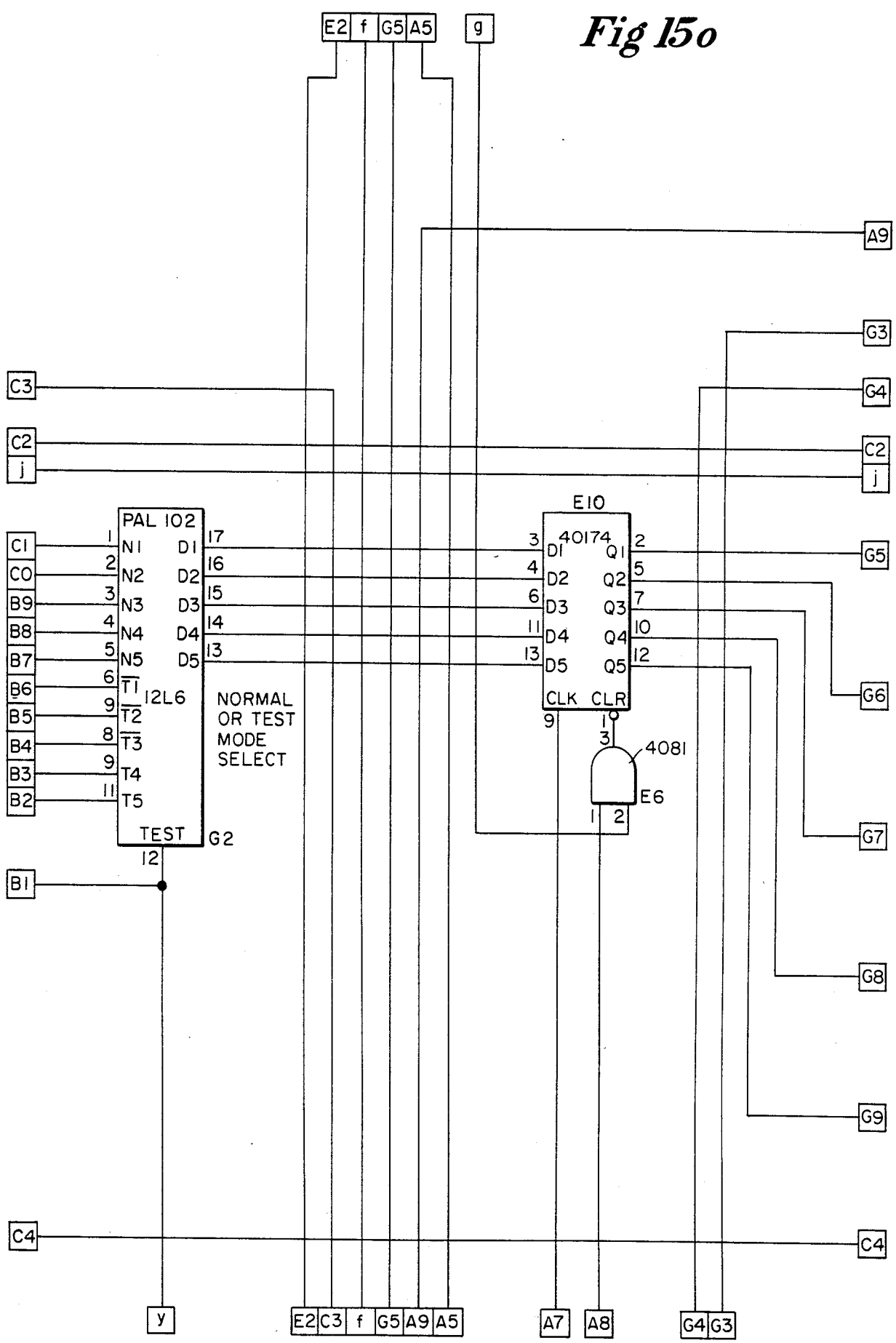
Figure 15P:
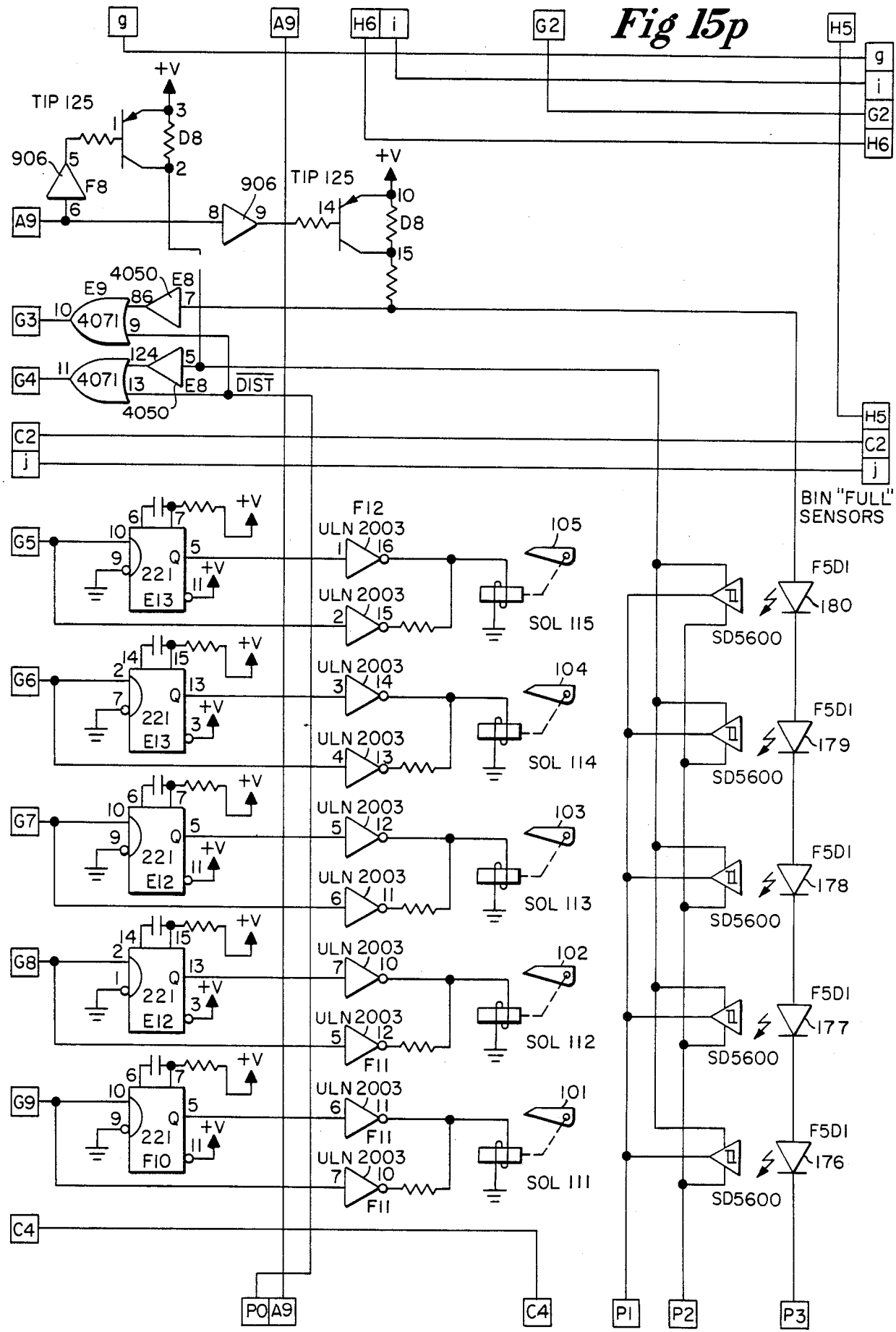

Coming back to C1 and pin 7, (FIG. 15b) a signal is gated through pins 4 and 6 of A7 (FIG. 15b) to prevent unloading when the the distributive sorter is busy, or when under EIA interface control, is routed to PAL 113 D3 (FIG. 15i) to trigger pin 5 of C9 (FIG. 15j). The 0.3 second pulse signal turns on door motor 160 which again rotates the cam 165 90° to the 270° position. Switch 166 controls the circuit until the next cam slot is reached at the 0° position. PAL 112, D2 (FIG. 15h) decodes the next step.

STEP 7

A signal from pin 4 from C1 (FIG. 15b) is routed through PAL 113, D3 to energize the solenoid hold down latch 170 (FIG. 15j) which holds the drive firmly in the down position while unloading the floppy disks and is positioned inside the loader body beneath the drive. Upon the LATCH CLOSED signal from the latch switch 173 it is routed through pins 6 and 7 of B13 (FIG. 15a) to pins 1, 2 of A15 (FIG. 15j) to pin 2 of B6 (FIG. 15d) with step 7 on pins 1 and 3 of B6 which enables pin 5 of C12 (FIG. 15d) to reverse the drive motor and pin 13 of C10 to start the sorter motor 70. When the reverse motor monostable multivibrator pin 12 of C12 (FIG. 15d) goes high, it clocks pins 3, 1 of C23 and becomes Go-To-8. PAL 112, D2 (FIG. 15h) decodes the next step.

STEP 8

Returning to pin 9 of C1, this signal is used to determine if the drive down latch signal has been released. When the LATCH CLOSED signal goes high, PAL 112, D2 (FIG. 15h) decodes the next step.

STEP 9

A signal is taken from pin 5 of C1 (FIG. 15b) and is routed to PAL 113, D3 to pins 10, 5 of C9 to trigger door motor 160. The operation is now the same as for Step 4.

RETRY CIRCUITS

If an action in the loader is taken but is not completed as shown by the sensors, the machine will try that action again in a number of sequences. If after that action, the action hasn't been completed, a jam condition will occur. "Null sort" will be enabled and an attempt to clear the jam will be completed. If the machine cannot clear itself, it halts all operations. The machine must then be physically cleared. This retry logic will have the effect of increasing the mechanical life of the machine by repulsing the solenoids and motors.

The main retry logic components are the delay generator C6 (FIG. 15i) and the retry counter A4 (FIG. 15i). The retry counter A4 is reset by the next Step pulse. The delay generator C6 is reset by either the next step pulse or at the start of a retry sequence.

DOOR MOTOR RETRY

In Step 4, the door motor 160 is commanded to close the door. If the DOOR CLOSED signal is not low after 2.66 seconds delay at pin 18 of D3 (FIG. 15*i*) then pin 8 of D3 will be low for 0.5 seconds which causes pin 15 of D3 to go low then high and repulse the door motor 160 (FIG. 15*l*). Then pin 15 of D3 (FIG. 15*i*) returns high as pin 10 of A3 (FIG. 15*j*) goes high and clocks the Retry Counter A4 (FIG. 15*i*). The delay generator C6 is reset and the retries will continue until the door closes or the retry counter counter reaches 8. Upon reaching 8, pin 9 of A4 (FIG. 15*i*) goes high and is gated with a Step 4 signal by pin 8 of D1 (FIG. 15*b*). When pin 15 of D1 (FIG. 15*b*) goes high the JAM line causes pin 10 of C5 (FIG. 15*h*) to go high. This resets latch pin 14 of D4 and puts the JAM line low. This then causes the loader to go to the "null sort" mode of operation where it would unload the floppy disk and eject it from the rear portion of the sorter 21. The above description is essentially the same for Step 6 and Step 9 retries also.

PICKER

For the pick retry, on Step 2, the loader 20 trys to pick a floppy disk from hopper 23. If the DISK IN ROLLER signal isn't low after a one second delay, then pin 7 of D3 (FIG. 15*i*) will go low for 0.5 seconds. The one shot multivibrator at pin 2, C9 (FIG. 15*j*) will be retriggered and the pick motor 131 (FIG. 15*f*) will be energized again. As pins 11 and 10 of A3 (FIG. 15*j*) go high, they clock the retry counter A4 (FIG. 15*i*) and resetting the delay generator C6. If the retry counter reaches 4, that is pin 10 of A4 (FIG. 15*i*) goes high, then pin 7 of D1 (FIG. 15*b*) goes high which causes the JAM line to go low and a "null sort" signal is initiated.

DRIVE DOWN LATCH

On Step 7, the latch solenoid 170 (FIG. 15*j*) is energized. If, after a one second delay, the LATCH CLOSED signal is still high, pin 7 of D3 (FIG. 15*i*) goes low for half a second, then goes high which deenergizes the solenoid 170 and then reenergizes the solenoid. When pin 16 of D3 (FIG. 15*i*) goes high, pins 13, 10 of A3 (FIG. 15*j*) goes high and the retry counter A4 (FIG. 15*i*) is clocked. Retries of this latch continue until a LATCH CLOSED signal goes low or the retry counter A4 reaches 8. If the retry counter A4 at pin 9 goes high, then the JAM line goes low and a "null sort" signal is initiated. On Step 8, the latch solenoid is deenergized. If a latch closed signal on pin 12 of D3 is still low after one second then pin 7 of D3 (FIG. 15*i*) goes high and energizes the solenoid for 0.5 seconds. Pin 10 of A3 (FIG. 15*j*) goes high which causes the retry counter A4 (FIG. 15*i*) to increment. If the retry counter output at pin 9 on A4 goes high then the JAM signal goes low and a "null sort" is initiated.

NOVOL RETRY

All retry operations are clocked into a Novol (non-volatile memory) counter A12 at pin 11 (FIG. 15*l*). This counter is a six-decade counter with non-volatile memory and multiplexed 7-segment display outputs. This counter drives a five digit common cathode display B13 (FIG. 15*l*) located on the circuit board (FIG. 3). A 2K resistor pack A10 (FIG. 15*l*) provides segment current limiting and the Darlington Drivers A14 provide the digit enable signals. The counter A12 is cleared by pushing the retry clear switch S185 (FIG. 15*l*), first in one direction and then the other. This action prevents accidental clearing of the counter. When power is first supplied to the machine, the number that was previously saved is recalled and displayed in the retry display B13.

NULL SORT LOGIC

The "null sort" operation is used to bring the loader from any possible condition back to a "ready" condition where it is ready to load a floppy disk from the hopper. Also any floppy disk present in the loader 20 when a "null sort" condition is started will not be put into a bin in the sorter but be sent beyond the last bin.

The null sort logic is based around a PAL 105 at E2 (FIG. 15*a*). This PAL 105 operates the present inputs of the sequence counter to enable the motors. The inputs to PAL 105 are the various sensors that tell what state the machine is presently in. From the sensor inputs, PAL 105 decides what event should occur next to get the machine back to "ready", and loads the step number into the sequence counter. For each step that develops into a "null sort" mode of operation, the clock input of the sequence counter A12 is kept from receiving any clock pulses because the NULL SORT signal on pin 3 of B2 (FIG. 15*a*) keeps pin 1 of B2 low. If, after a step occurs, the OK line goes low at pin 6 of D6 (FIG. 15*b*) then the loader is "ready" and the "null sort" mode of operation is complete.

The following conditions will initiate a null sort mode of operation:

(1) Power Up—this is a condition to get the loader into the "ready" mode of operation.

(2) A power line drop out of three or more cycles. This is to discharge the floppy disk that is being tested or duplicated, because the test function could be effected by the line dropout.

(3) Where a jam condition occurs, a "null sort" will clear a floppy disk and put the loader into an OK condition. If a floppy disk is jammed and the loader can't clear the jam, after a predetermined number of tries, the loader is halted and an "all sort" operation is terminated.

(4) A Master Clear signal clears the loader and puts it into the OK condition.

(5) A jogged floppy disk clears the disk without testing and prevents ruining a floppy disk. A low state on any one of the inputs of pins 1, 2, 8 and 9 of D20 (FIG. 15*q*) causes the latch to set and pin 6 of D20 will go low. This latch is reset by the OK on pin 4 of D20 or when pin 11 of C18 (FIG. 15*r*) goes low. This line is controlled by a counter C17 (FIG. 15*r*) that counts the number of times the sequence counter is preset in the "null sort" mode. Upon this counter C17 reaching the count of 12, pin 11 of C18 goes low and the "null sort" mode is aborted and the machine is halted. This is done in the event that a disk is stuck and the loader can't move it out of the drive. This procedure keeps the "null sort" signal from happening forever if something is really jammed in the loader.

FRONT PANEL SWITCHES AND INDICATORS

The front panel switches and indicator lamps provide the operator an interface to the loader-sorter unit. These switches are all momentary contact push botton switches and their functions are as follows:

HALT

Figure 15Q:
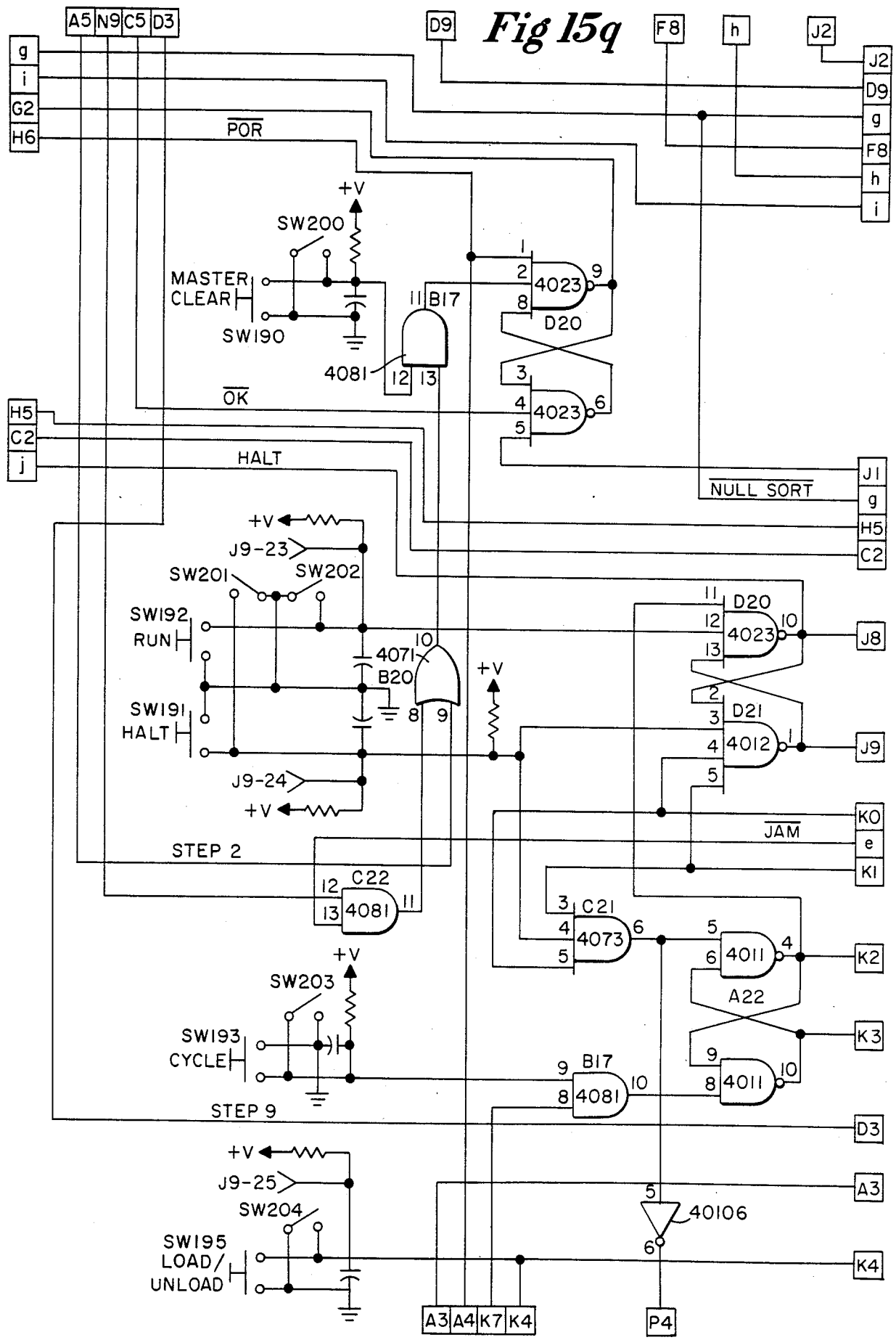
Figure 15R:
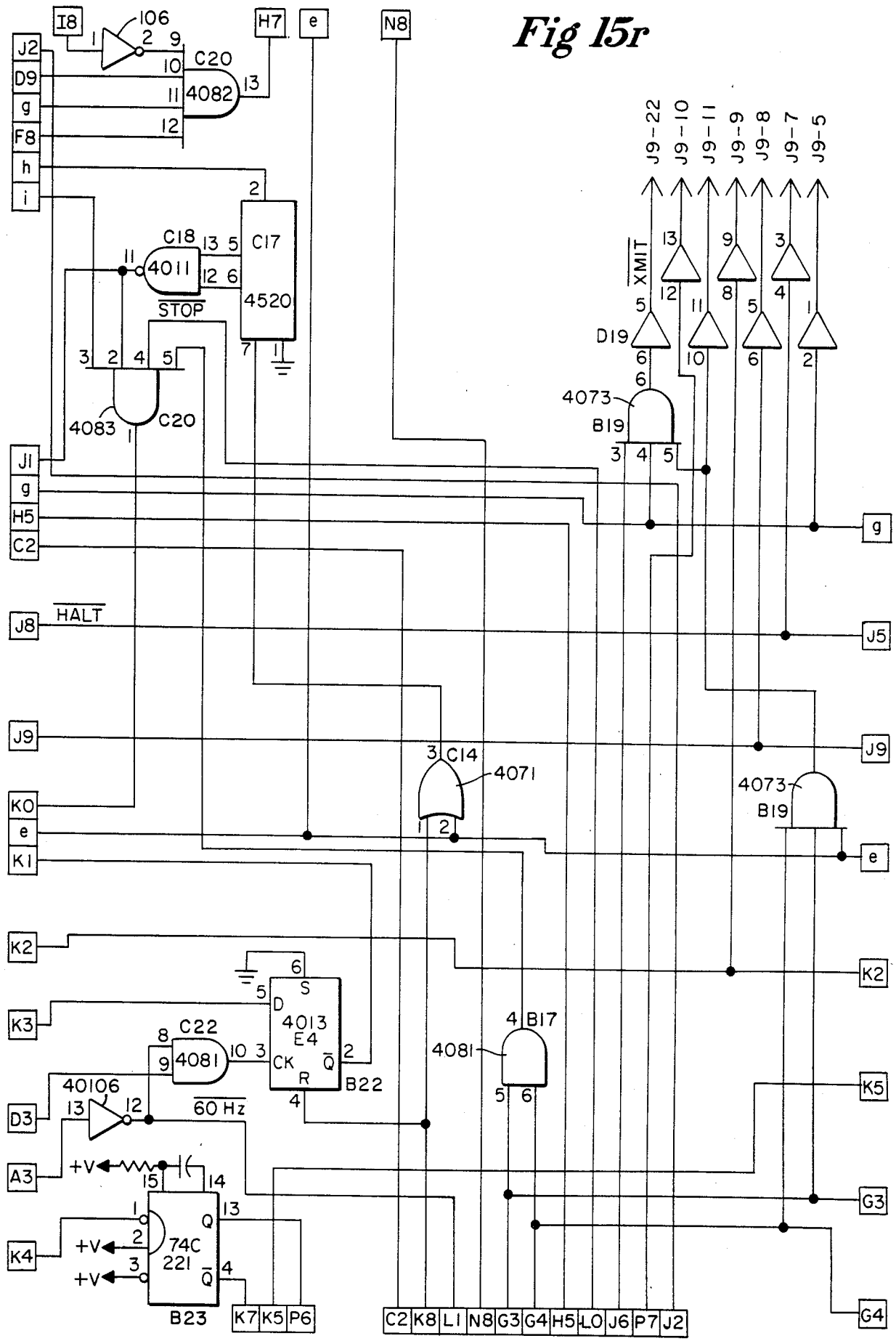
Figure 15S:
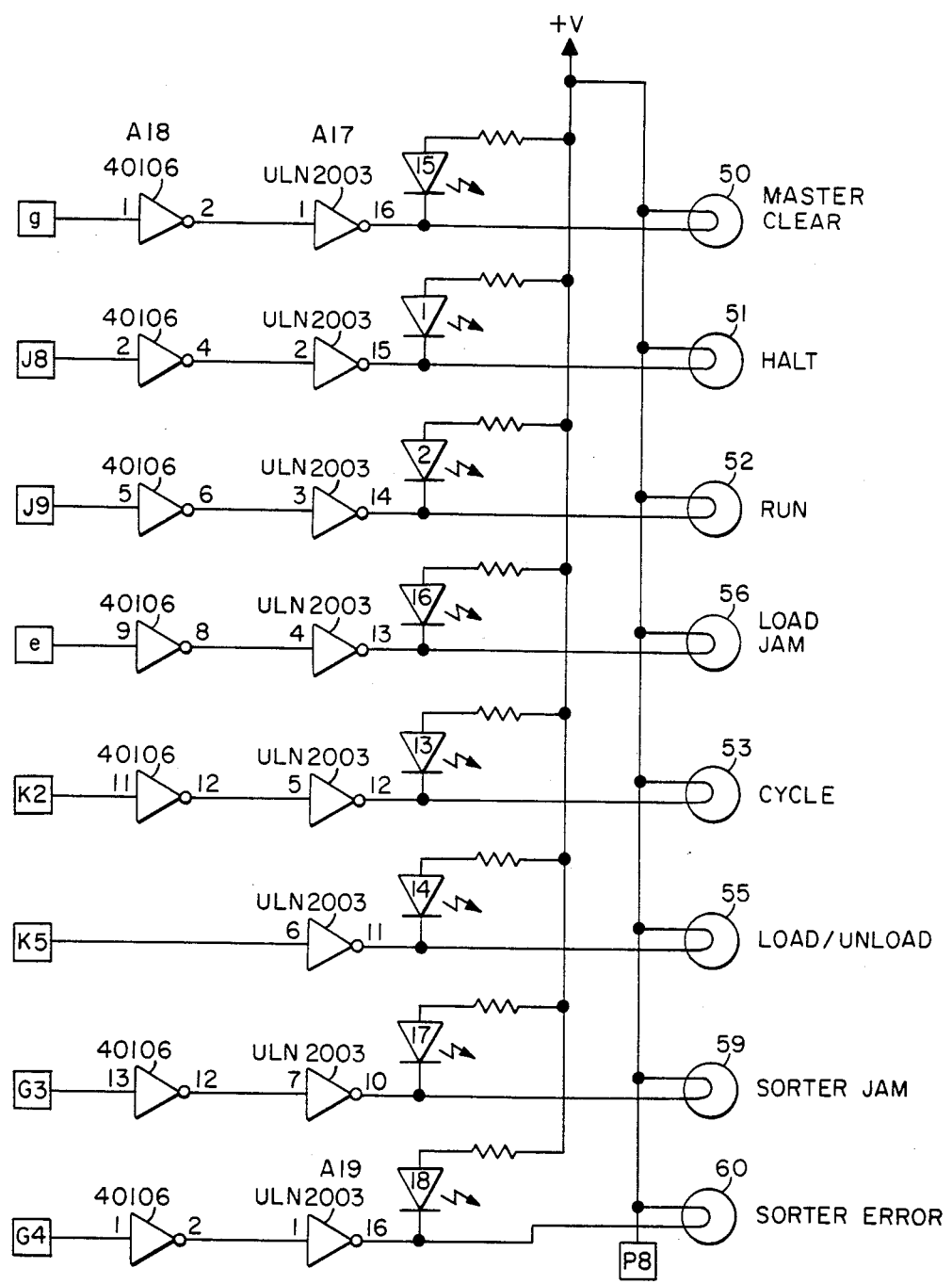
Figure 15U:
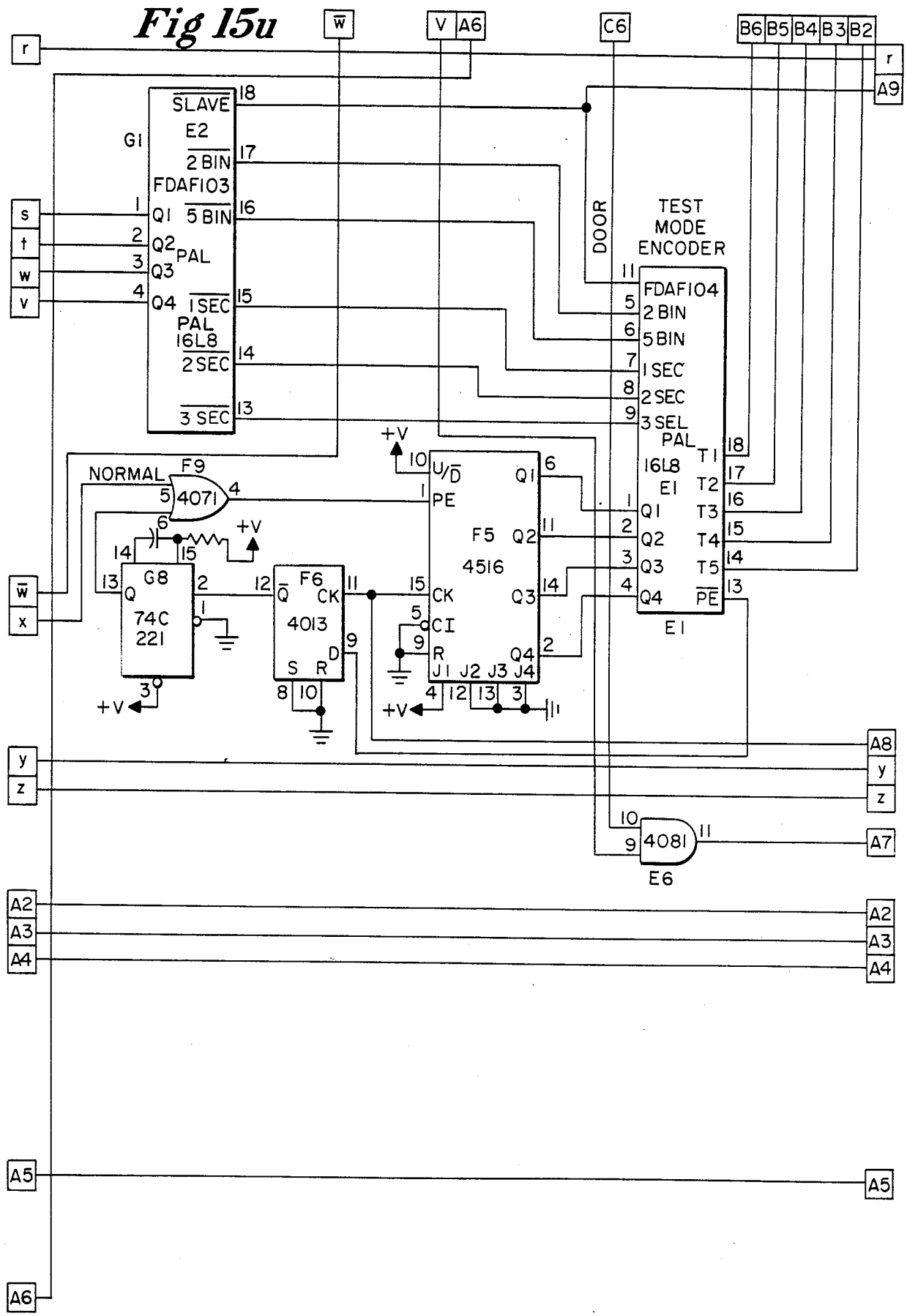
Figure 15V:
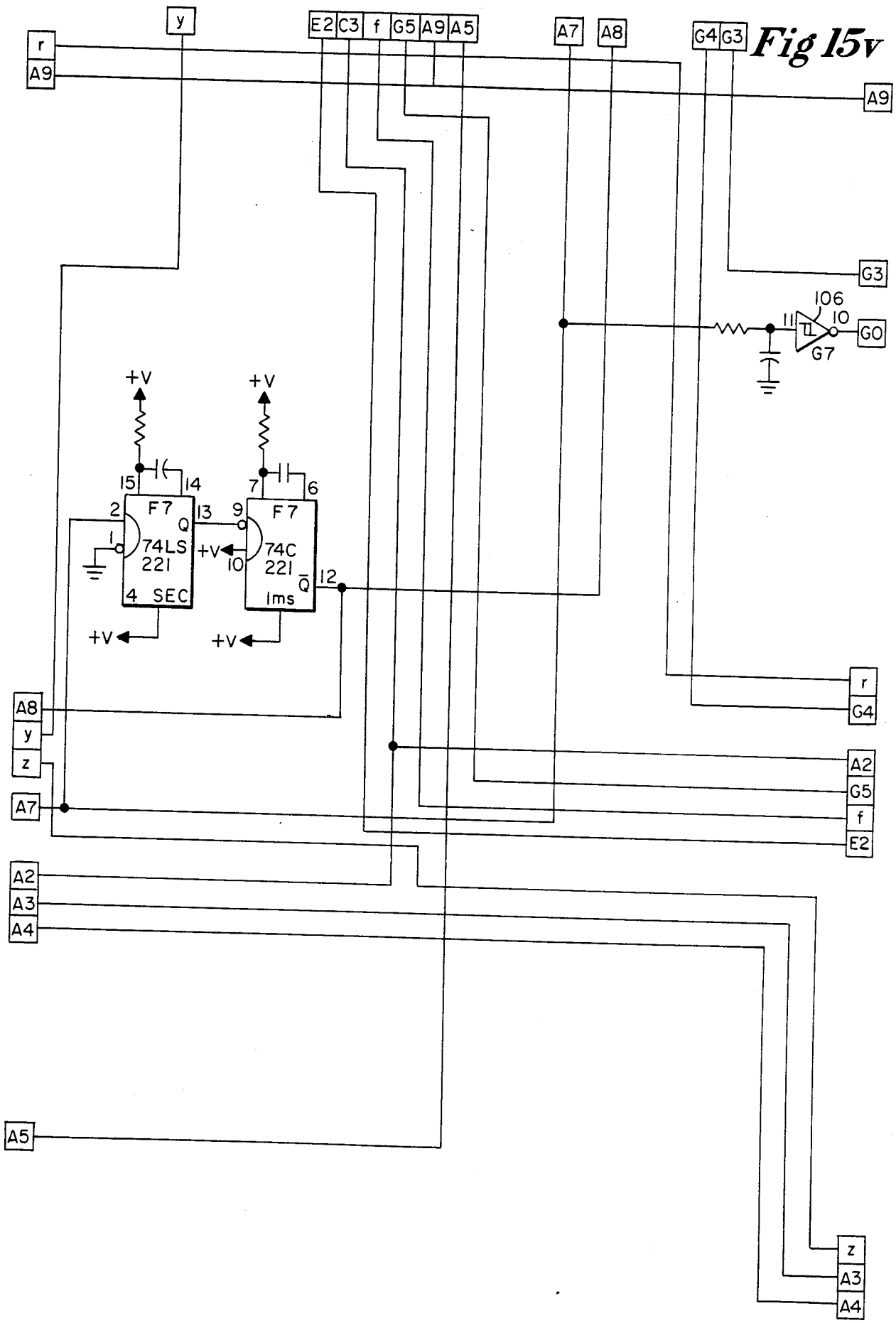

A switch 191 and lamp L51 work together and when pressed, the machine will finish its present step and then stop. The red halt lamp L51 is in the switch body and is illuminated whenever the machine is in the "halt" mode of operation (FIG. 15*q*).

RUN

A run switch 192 and lamp 52 form a unit and when the switch is pressed, the machine will begin operation, assuming all conditions are suitable. The green run lamp L 52 is located in the switch body and is illuminated whenever the machine is operating.

CYCLE

A switch 193 and lamp L53 operate together and when pressed, the machine will load, test, unload and sort one floppy disk. The white cycle lamp L53 will be illuminated during this period of time.

LOAD-UNLOAD

A load-unload switch 195 and lamp L55 work in unison and when pressed, the loader will load a floppy disk and the lamp will stay illuminated. The machine will wait until the load-unload switch is pressed again before loading another floppy disk. When the unloading sequence takes place, lamp L55 is no longer illuminated.

MASTER CLEAR

The master clear switch 190 and lamp L50 operate together and when pressed, the loader clears itself to the "ready" state where it is ready to load a floppy disk. The white Master Clear lamp L50 will be illuminated while it is performing the clear function, either when the switch is pressed or in a power up condition or when a problem occurs in the machine operation and "null sort" is set.

SORT CLEAR

Figure 15X:
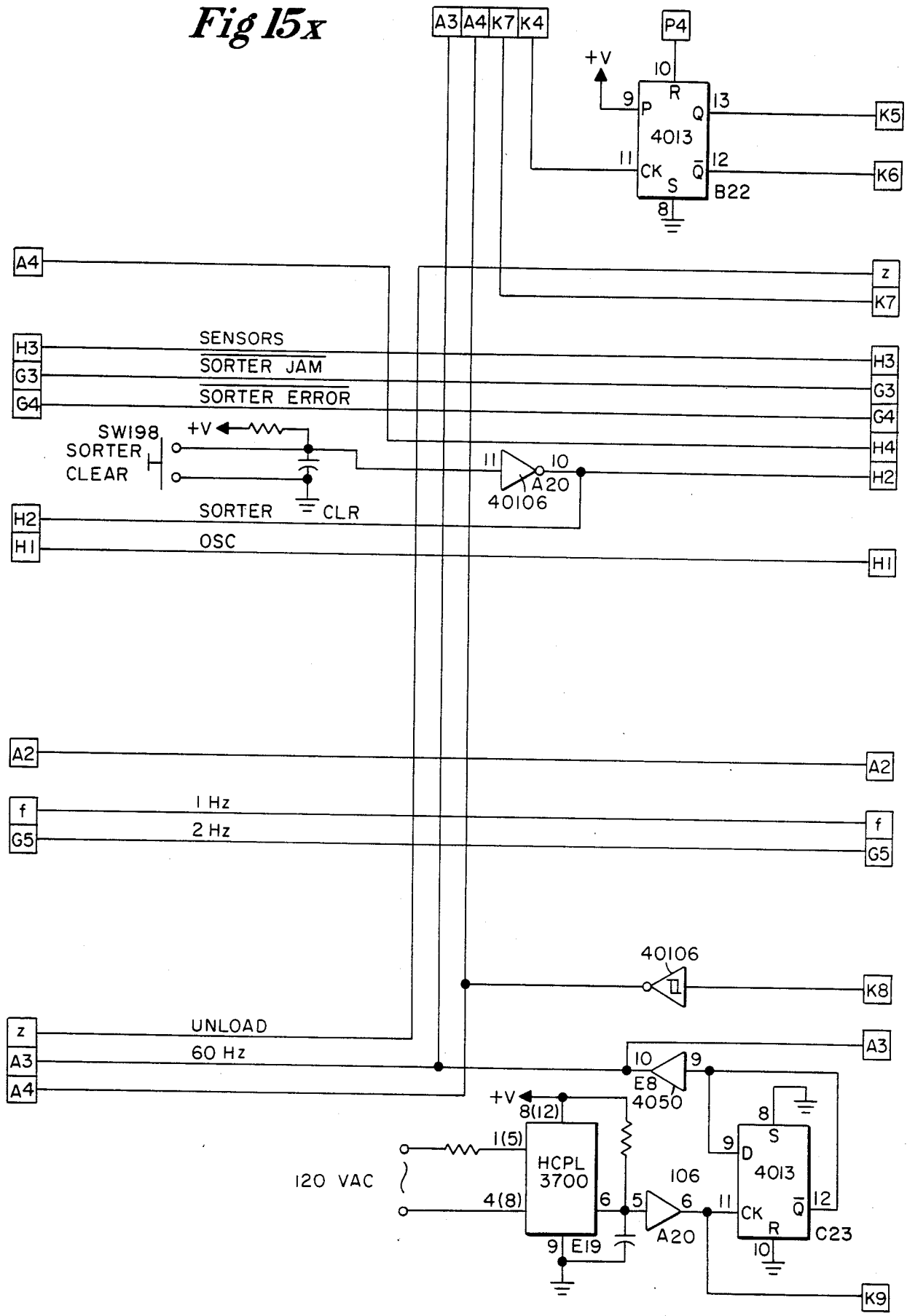
Figure 15Y:
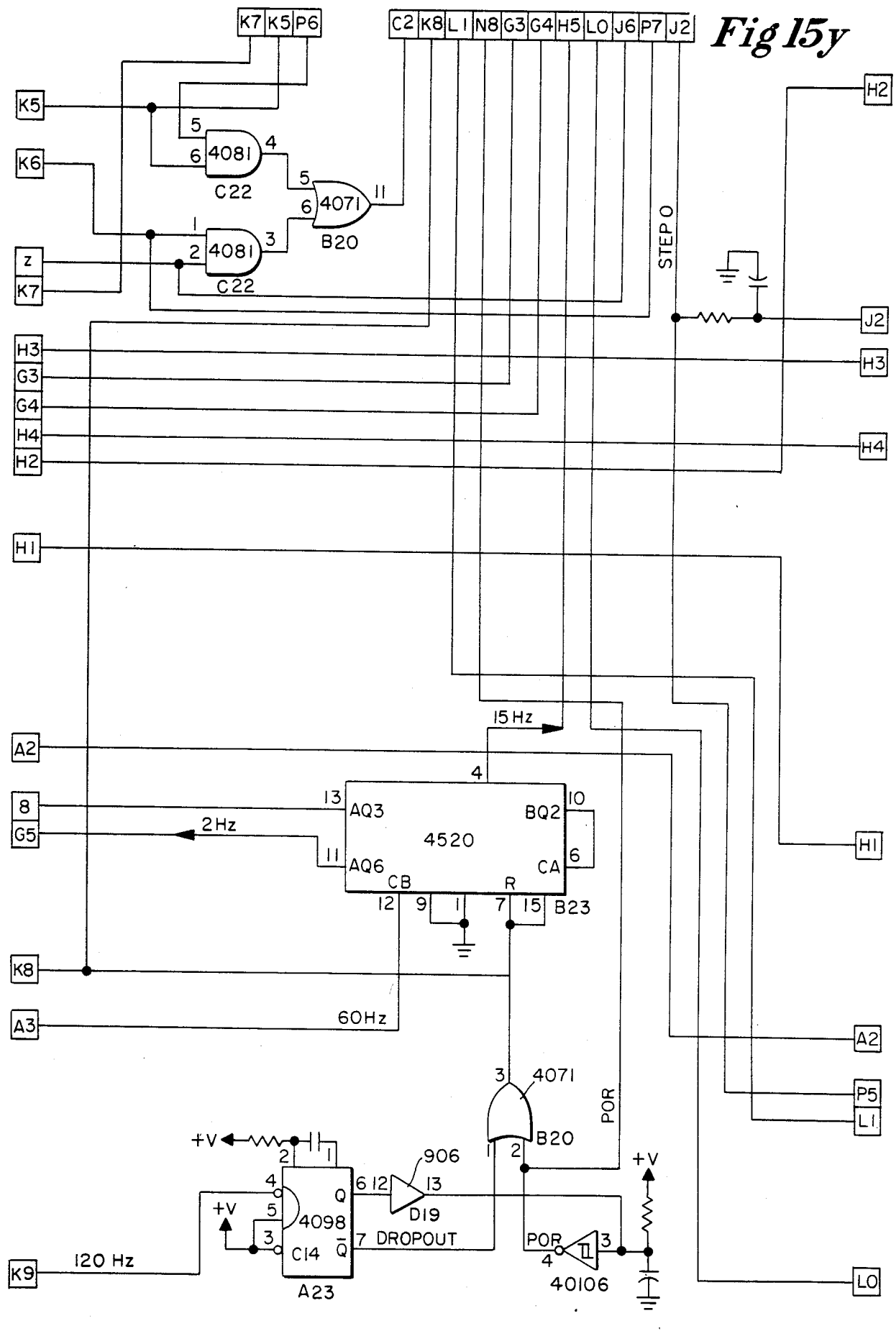
Figure 15Z:
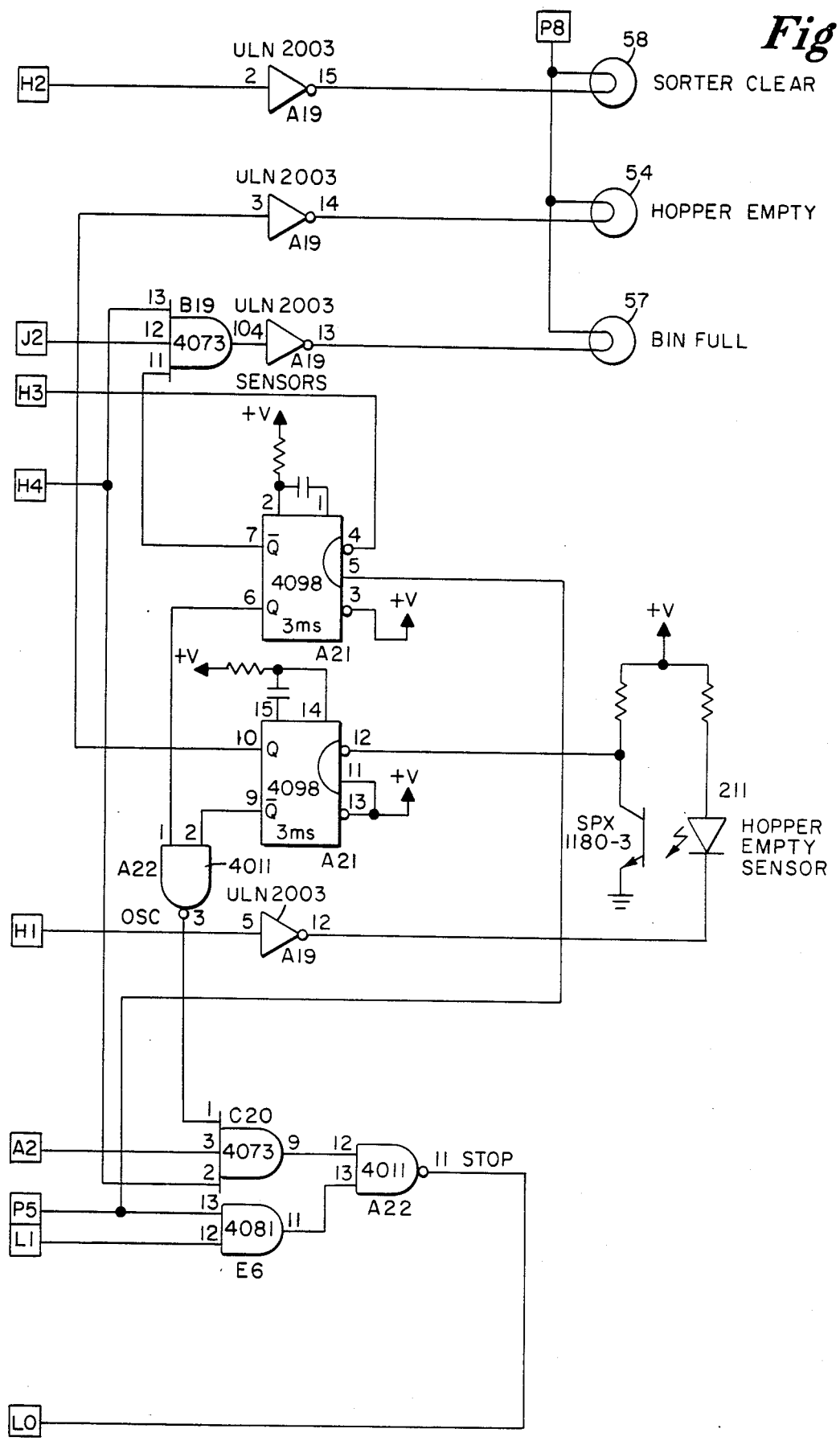

A sort clear switch 198 and lamp L58 operate together and when pressed resumes operation after a jam in the sorter has been cleared by the operator. Switch 198 is operated when a distributed sorter is being used (FIG. 15x).

HOPPER EMPTY

A hopper empty lamp is illuminated whenever the floppy disk hopper 23 is empty. When the hopper is empty, this will halt the loader's operation.

LOAD JAM

Yellow lamp L56 indicates when illuminated, that a jam has been detected in the loader. The loader will then attempt to clear itself and repeat this attempt. If the problem can be cleared by the loader, then normal operation will automatically resume. Otherwise the machine will go into the Halt state of operation and the load jam lamp L56 will remain illuminated (FIG. 15s).

BIN FULL

Yellow lamp L57 indicates that one of the sorter bins has been filled and such action will stop the loader (FIG. 15z).

SORT JAM

Yellow lamp L59 will become illuminated when a jam in the distributed sorter has been detected by the sorter electronics. The lamp will remain illuminated until the sort clear switch 198 is depressed (FIG. 15s).

SORTER ERROR

Yellow lamp L60 is illuminated when the distributed sorter electronics indicates that a floppy disk did not pass into the bin that was selected and is used with distributed sorter units (FIG. 15s).

DUPLICATE SWITCHES AND LAMPS

There are a number of switches that perform the same functions as those just described above but are used individually to operate various portions of the circuit and they have the same function as those described above and are a halt switch 201, a run switch 202, a cycle switch 203, a load-unload switch 204, (FIG. 15q) and the error-clear switch 185 (FIG. 15l). In addition to these switches, there are five switches which are directed towards control of the motors to operate a particular motor independent of other motors and they are:

ROLL MOTOR-SWITCH 205 (FIG. 15e) is a three position toggle switch that causes the roll motor 140 to operate in either direction. The center position of the switch is "off".

A CLAMP MOTOR SWITCH 206 (FIG. 15k) is a toggle switch that turns on door motor 160 and moves the drive upwardly and downwardly. The switch operates in one condition to complete one cam cycle of cam 165 and the other position creates a constant signal to drive motor 160.

PICK-LATCH SWITCH 207 is a three position toggle switch that operates the picker motor 131 when pressed in one direction and energizes solenoid 170 for the hold down latch in the other direction (FIG. 15e).

SORTER MOTOR SWITCH 208 (FIG. 15e) is a three position toggle switch that operates sorter motor 70 in one direction or the other.

The EXERCISE-SELF TEST SWITCH 209 (FIG. 15t) is a three position toggle switch that operates the machine in an exercise mode or in a self test mode. In the exercise mode, the loader-sorter motors run in normal sequence but at a speeded up rate and without any floppy disks in the system. In the self-test mode, the loader 20 takes floppy disks from the hopper and sorts them into consecutive bins without actually testing the floppy disks.

Each of the associated LED lamps with the various switch functions just described are now indicated with reference to FIG. 3 wherein the lamps indicate the following functions:

| | |
|---|---|
| 1. Halt | 11. Latch Closed |
| 2. Run | 12. Drive "Up" |
| 3. Speed "OK" | 13. Cycle |
| 4. Pick | 14. Load-Unload |
| 5. Disk "In Roll" | 15. Clear |
| 6. Disk In Place | 16. Loader Jogg (Jam) |
| 7. Drive "Down" | 17. Sorter Jogg (Jam) |
| 8. Door Closed | 18. Sorter Error |
| 9. Motors "On" | 19. Exercise |
| 10. Door Open | 220. Test. |

In addition to the above devices, there is also disclosed a sequence counter display 210 that is also identified as a chip TIL 311 that shows the state that the mechanism is presently operating in. This mechanism displays the digits 0–9 as the loader is operating (FIG. 15b).

In addition to the sequence counter, there is also a retry counter B13 display that is a five digit LED display showing the number of retry operations that the machine has attempted while operating (FIG. 15l). This mechanism is controlled by a counter A12 that has a non-volatile memory.

SYSTEM CLOCK LOGIC

The various clock signals for the logic are derived from the alternating current power line. 120 volts AC is applied to E19 (FIG. 15x) where it is applied to an opto-isolator that can convert the alternating current to a 120 Hz logic signal. The output of pin 6 of E19 is divided by two and a 60 Hz signal is obtained on pins 11–12 of C23. This signal is further divided by the counter B23 to give a 15 Hz signal at pin 4, a 2 Hz signal at pin 11 (FIG. 15y) and a 1 Hz signal at pin 12. A 120 Hz signal is applied to retriggerable monostable multivibrator pin 4 of A23 for 43 milliseconds. This detects a power line dropout of more than 1½ cycles. The signal on pin 6 of A23 (FIG. 15y) goes low which drives the open drain gate pins 12 and 13 of D19 and produces a POR low signal which indicates a "power on reset" signal. This will produce a "null sort" signal and eject any floppy disk that is in the system.

"WHAT AM I" CIRCUIT

The "What Am I" circuit is composed of the 4516 counter G5 (FIG. 15t) and PAL-FDAF103 (FIG. 15u) which determines the form of sorter which is attached to the loader. On a POR signal, the open drain buffer G4, at pin 13 (FIG. 15t) is energized, pulling the "What Am I" line low. This discharges a capacitor C (FIG. 15t) which is connected to the "What Am I" line on the sorter. When the POR signal returns high, pin 13 of G14 turns off, allowing the capacitor C on the sorter to charge through an 82.5K resistor connected between the "What Am I" line and plus 5 volts. At that time, the counter G5 is enabled and is clocked by the 60 Hz line. When the capacitor on the sorter charges to the turn-on threshold of pins 1 and 2 of G7, the counter is disabled. The counter outputs are applied to G1, a PAL 16 L8 (FIG. 15u) which determines from the count the type of sorter that is connected to the loader. If a 2-bin sorter is connected it has no capacitor connected to it so the count will be 0. The PAL G1 drives the 2-BIN and the SLAVES outputs, pins 17 and 18 low. A 5-bin slave sorter has a 0.68 uF capacitor attached so the counter will count to one or two before it is disabled causing the PAL G1 to put the 5-BIN and SLAVE low at pins 16 and 18. If the distributed sorters are used, each has a 1.0 uF capacitor attached to the "What Am I" line, so if there are two distributed sorters connected to the loader there would be a 2.0 uF capacitance on the "What Am I" line. This arrangement would cause the counter to count between 7 and 11.

BIN SELECTION

In the normal operating mode, the process function will send the selected bin address signal to PALG3 (FIG. 15m). Normally this number EC1-EC2 will be put on the output terminal pins 13–17 of N1-N5. However, if the EIA line is low or a computer is attached by the way of the EIA interface board, then the number is present on pins 13–17 of N1-N5.

In the Test Mode, the Test Mode switch 209 on the loader board is on, the bins selected are determined by counter F5 (FIG. 15u) and by the E1 Test Mode encoder. When the Test Mode switch 209 completes the circuit, the counter outputs will be 1 because this is preset in the counter in the normal mode. The counter outputs are encoded by E1 (FIG. 15u) so that the correct bin number representation is present at the T1-T5 inputs of PAL 102, G2 (FIG. 15o) depending on the sorter type output from PAL G1. In the test mode, PAL G2 takes the T1-T5 inputs and inverts them and gates them to the D1-D5 outputs, otherwise the N1-N5 inputs are inverted and gated to the outputs. When Step 6 of the 10 step sequence occurs, the outputs of PAL G2 are clocked to the Q outputs of hex flip-flop E10 (FIG. 15o). If the slave sorter is connected to the loader, then the Q1 output of E10 goes high, firing a one shot multivibrator at pin 5 of E13 (FIG. 15p). This signal turns on the ULN 2003 Darlington transistor driver at pins 1 and 16 of F12 for 150 milliseconds to supply a high current pulse to solenoid 115 to open the bin. Also the Darlington transistor driver at pins 2 and 15 of F12, is turned on and supplies reduced current to hold solenoid 115 on to keep the bin open. The effect is to open the bin gently instead of slamming it open. Four seconds after Step 6 occurs, a pulse from one shot multivibrator pin 12 of F7 (FIG. 15v) clears the flip-flops at E10 (FIG. 15o) and also clocks the counter F5 (FIG. 15u) so that bin-2 will be selected the next time. Depending on the type of sorter connected to the loader, PAL 16 L8 (E1) will send a PE (Preset Enable) signal to the counter when the highest bin number is reached and a "1" will be loaded into the counter on the next clock pulse.

When the SLAVE line is high, the outputs of the solenoid driver Darlington amplifiers F12 and F11 (FIG. 15p) will be used as a binary bin address and will activate inputs on the distributed sorter logic board (not shown). The START signal, routed through F11, pins 4 and 13 (FIG. 15w) when the SLAVE signal is high tells the sorter that the bin number is valid and that the loader is starting to unload the floppy disks. The distributed sorter logic then opens the correct bin and starts up the sorter motor. When the SLAVE signal is high the sorter signals are applied to the buffer and drivers E8 (FIG. 15p) at lines 4, 5, 6 and 7 as the SORT JAM and SORT ERROR input signals respectively. These signals illuminate the appropriate front panel lamps and stop the loader operation.

BIN FULL SENSORS

When the sorter is a slave type, the sorter connection to pins 6 and 7 of E8 (FIG. 15t) becomes the positive voltage to the bin full sensors 176 and 177 because the SLAVE signal turns on the Darlington transistor drivers at D8 (FIG. 15p). A line from pin 14 of F11 is connected to the last emitter of the series string of bin full sensors 176 through 180 (FIG. 15p) and provides pulsed current of 350 milliamps to the sensors. This line is pulsed only during Step 0 to avoid noise interference with other loader operations. The SD 5600 bin full sensors are also powered by a similar arrangement when the SLAVE signal is low. The bin full sensors shoot a pulsed beam of light to a reflective strip on the other side of sorter bins 25 through 29 (FIGS. 1 and 13). The beam is reflected back to the sensors 176 through 180 which have a logic compatible output where they are connected together in "AND" fashion so that when one bin becomes full of floppy disks, the beam is broken and a pulse stream feeding into pins 2 and 3 of E8 (FIG. 15w) is broken. This pulse stream is gated by pins 5, 6 and 4 of E6 and sent to retriggerable monostable flip-flop A21, on pin 4 (FIG. 15z). The output of A21 on pins 6 and 7 stays retriggered as long as the pulse stream is unbroken. When a bin becomes full, A21, pin 6 goes high and sends a STOP signal from pin 11 of A22 to stop the loader.

HOPPER EMPTY SENSOR

A Hopper Empty Sensor is a SPX 1180-3 (FIG. 15z) retroreflect sensor attached to the bottom of base 136 forming the bottom of hopper 23. The LED is pulsed at a coherent rate through a ULN2003 Darlington amplifier driver A19 on pins 5 and 12 (FIG. 15z). When the hopper 23 is empty, the reflective material on the side of the hopper allows the photo transistor to pulse on and off at the coherent rate keeping pins 12 and 10 of A21 retriggered which turns on the hopper empty lamp L54 through pins 13 and 14 of A19. Pin 6 of A21 sends its signal through A22 pins 2 and 3 which in turn drives C20, pins 1 and 9 and A22, pins 12 and 11 to stop the loader. The coherent rate selected provides immunity from normal ambient light frequencies.

JOGGED DISK CIRCUIT

During Step 3 the floppy disk is checked to make sure that it is in the jacket properly. This circuit consists of an Optical Sensor 127 that is formed in two parts and mounted in the front center of the drive. When sensor 127 sees the jacket edge of the disk coming in, pin 13 of latch A1 (FIG. 15k) goes low enabling counters B14 and B15 (FIG. 15k). These counters set the minimum time that pin 13 of A1 must stay low. The counters B14 and B15 are clocked by code wheel 141 on roll motor 140 (FIG. 15e). If light shows through the head window of the disk, then C15 (FIG. 15k) is clocked before pin 9 of A1 is reset low by the counter overflowing. This action causes pin 13 of D21 (FIG. 15k) to go low and the JOGGED DISK signal from pin 4 of C18 also goes low, causing the loader to "null sort" and eject the floppy disk from the rear of the sorter. If light does not show through the head window of the disk, then the counters B14 and B14 will overflow, resetting pin 9 of A1 (FIG. 15l) and enabling counter B16. Switch C16 (FIG. 15k) sets the maximum allowable distance before the centerhole of the disk permits light through the sensor 127. If C15 (FIG. 15k) is not clocked to stop the code wheel 141 pulses from closing the counter B16 (FIG. 15l) before it overflows, then pin 10 of C18 (FIG. 15k) will go low causing the JOGGED DISk signal at pin 14 of C18 to initiate a "null sort" signal and eject the disk from the sorter. Therefore, if the floppy disk is not within preset limits within the jacket, it is then ejected rather than closing the door thereby damaging the disk.

SYMBOLS USED IN LOGIC CIRCUIT

The following symbols are used throughout the logic circuit and will help identify the condition of certain lines in the circuit. Where the symbol includes a bar underneath the wording or abbreviation it indicates that the drive symbol is low and where the bar is removed it indicates the signal is high. Only the "high" signal will be used to disclose the following:

| | |
|---|---|
| MO - Motor "On" | DIP - Disk In Place |
| LC - Latch Closed | DC - Door Closed |
| DO - Door Open | UTS - Up To Speed |
| DU - Drive Up | 0.5D - 0.5 Second Delay |
| DD - Drive Down | POR - Power On Reset |
| DIR - Disk In Roller | PE - Power Enable |

In considering this invention, it should be remembered that the present disclosure is illustrative only and the scope of the invention should be determined by the appended claims.

We claim:

1. Floppy disk handling apparatus comprising:
 (a) a box-like hopper for holding a plurality of floppy disks in a stacked relationship, said hopper having an exit opening along a lower edge thereof:
 (b) a picker mechanism having a gate at a predetermined elevation for separating the disks in said hopper and moving the lowermost floppy disk in the stack through said exit opening in said hopper;
 (c) reversible pinch roller drive means for selectably moving a picked one of said floppy disks exiting said opening in a first direction;
 (d) a rotatable floppy disk drive means including a frame and a disk motor disposed on said frame, said disk drive means being positioned adjacent said picker mechanism and being adapted to receive said floppy disk when said floppy disk is moved in said first direction and to provide a predetermined rotational movement to same;
 (e) sensor means disposed proximate one edge of said floppy disk drive means for detecting movement of the edge of a picked one of said floppy disks; and
 (f) diverter means operatively coupled to said sensor means and said frame of said floppy disk drive means for moving said rotatable floppy disk drive means frame to an elevation other than said predetermined elevation upon actuation of said diverter means by said sensor means.

2. The apparatus as in claim 1 and further including:
 (a) sorter drive means disposed adjacent said pinch roller drive means and communicating therewith to receive and distribute the floppy disks;
 (b) a plurality of bins disposed serially downstream from each other and communicating with said sorter drive means for selectively receiving said floppy disks based upon a predetermined criteria;
 (c) measuring means connected to said pinch roller drive means for determining the distance a floppy disk has traveled under control of said pinch roller means;
 (d) counting means connected to said sensor means and said measuring means and creating a signal representative of a distance to one of said serially located bins; and
 (e) a plurality of flipper fingers disposed above said corresponding plurality of bins and connected to said counting means for deflecting a floppy disk from its path of travel into one of said bins.

3. The apparatus as in claim 2 and further including:
 (a) another sensor means disposed between said first mentioned sensor means and said rotatable floppy disk drive means for transmitting signals relating to the position of said floppy disk in its path of travel; and
 (b) means connecting said another sensor means to said counting means and said reversible pinch roller drive means for slowing the rate of movement of the disk.

4. The apparatus as in claim 3 where said pinch roller drive means is driven by a slower pulse rate signal upon said another sensor means transmitting signals.

5. The apparatus as in claim 2 and further including:
 (a) signal switching means connected to said measuring means for changing the number of signals generated by said measuring means to be representative of the distance a disk has traveled into said floppy disk drive means.

6. The apparatus as in claim 1 and further including:
 (a) control means connected to said pinch roller drive means for changing the direction of rotation of said pinch roller drive means; and
 (b) second sensor means operatively disposed with said floppy disk drive means for detecting the position of a floppy disk with respect to said floppy disk drive means and sending a signal representative of said position to said control means.

7. The apparatus as in claim 6 and further including:

(a) null sort detection means connected to said second sensor and to said control means for supplying a direction reversing signal to said control means, for ejecting a floppy disk from said rotatable floppy disk drive means.

8. The apparatus as in claim 1 wherein said hopper has disk retaining fingers disposed proximate the bottom of said hopper, said fingers nesting in openings formed in the base of said picker mechanism.

9. The apparatus as in claim 1 and further including:
(a) a hopper empty sensor disposed in the bottom of said hopper and producing a signal when said hopper becomes empty;
(b) a first gating means connected to said hopper empty sensor and supplying an output signal; and
(c) indicator lamp means connected to said first gating means and producing a signal representative of the empty condition of said hopper.

10. The apparatus as in claim 9 and further including:
(a) second gating means connected to said first gating means and said reversible pinch roller drive means for creating a signal to stop said reversible pinch roller drive motor operation.

11. The apparatus as in claim 1 and further including:
(a) delay generator means producing a signal after a predetermined delay of time;
(b) clock signal generator means connected to said delay generator means for producing a timed signal;
(c) retry counter means connected to said delay generator means and receiving a signal therefrom; and
(d) door motor control means connected to said delay generator and retry counter means for receiving signals therefrom and sending an output signal to said rotatable floppy disk drive means for controlling the condition of the door to said floppy disk drive means.

12. The apparatus as in claim 11 and further including:
(a) a retry display connected to said clock signal generator means for displaying the number of retrys made by said clock signal generator and wherein said clock signal generator includes a non-volatile memory means.

13. The apparatus as in claim 1 wherein said picker mechanism includes:
(a) a pick knife disposed in the bottom of said hopper and adapted to engage the bottommost disk in a stack and to move said bottommost disk through the opening in said hopper during an oscillating operating cycle;
(b) pick motor means having a controllable brake mechanism, said pick motor and said brake controllable through signals to the same;
(c) an eccentric connected between said pick motor and said pick knife for operating the latter; and
(d) a switch mechanism electrically connected between said pick motor means and ground, and mechanically operated upon said pick knife returning to the start of said cycle.

14. The apparatus as in claim 13 wherein said pick knife is positioned to engage the jacket of the bottommost floppy disk when said jacket has an open flap at its top, and to slip beneath the jacket of the bottommost floppy disk when its flap is on the bottom.

15. An apparatus for sorting floppy disk of the type containing a rotatable magnetic medium with an outer jacket comprising:
(a) floppy disk drive means for receiving a floppy disk from a supply hopper and for rotating the magnetic medium within its jacket;
(b) sorter conveyor means disposed adjacent said floppy disk drive means and communicating therewith to receive and transport floppy disks exiting said floppy disk drive means;
(c) a plurality of serially disposed bins, each communicating with said sorter conveyor means for selectively receiving floppy disks therein;
(d) sensor means disposed adjacent said sorter conveyor means for detecting movement of the leading or trailing edge of said floppy disk;
(e) measuring means including pinch roller drive means connected to said sensor means for measuring the extent of travel of said floppy disk along said conveyor means;
(f) counting means connected to said sensor means and said measuring means creating a signal representative of a location of a predetermined floppy disk on said conveyor means; and
(g) a plurality of flipper fingers connected to said counting means for deflecting a floppy disk from said sorter converter means into a selected one of said bins.

16. The apparatus as in claim 15 wherein said sorter conveyor means includes:
(a) a lower drive section having a first plurality of pinch rollers, in which at least one pair of said plurality of disposed ahead of each of said plurality of bins;
(b) an upper driven section having a second plurality of pinch rollers in which at least one pair of said second plurality mates with, and is driven by, said first plurality; and
(c) hinge means operatively securing the drive section and driven section to each other while permitting them to open with respect to each other.

17. The apparatus as in claim 16 and further including:
(a) a plurality of leaf spring members secured to said upper driven section for supporting said second plurality of pinch rollers in biased relationship with said lower driven section.

18. The apparatus as in claim 16 and further including:
(a) motor drive mechanism operably connected to each of said first plurality of pinch rollers of said lower drive section for propelling said disks along a path of travel.

19. The apparatus as in claim 15 and further including:
(a) a plurality of "bin-full" sensors, each disposed across the top of said plurality of bins and creating a signal when any one of said plurality of bins becomes filled with said floppy disks; and
(b) a stop signal generator connected to said bin-full sensors and said sorter conveyor means for creating a stop signal when any one of said plurality of bins becomes filled.

* * * * *

UNITED STATES PATENT AND TRADEMARK OFFICE
CERTIFICATE OF CORRECTION

PATENT NO. : 4,571,645
DATED : February 18, 1986
INVENTOR(S) : Ronald R. Johnson et al It is certified that error appears in the above-identified patent and that said Letters Patent are hereby corrected as shown below:

Column 20, Line 5, before "motor" insert -- drive --.

Column 22, Line 22, before "conveyor" insert -- sorter --.

Column 22, Line 29, "converter" should read -- conveyor --.

Column 22, Line 52, before "motor" insert -- a --.

Signed and Sealed this

Twenty-fourth Day of June 1986

[SEAL]

Attest:

DONALD J. QUIGG

Attesting Officer

Commissioner of Patents and Trademarks